United States Patent
Kinoshita

(10) Patent No.: US 11,676,242 B2
(45) Date of Patent: Jun. 13, 2023

(54) IMAGE PROCESSING APPARATUS AND IMAGE PROCESSING METHOD

(71) Applicant: SONY GROUP CORPORATION, Tokyo (JP)

(72) Inventor: Yukihiro Kinoshita, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/285,577

(22) PCT Filed: Sep. 26, 2019

(86) PCT No.: PCT/JP2019/037881
§ 371 (c)(1),
(2) Date: Feb. 28, 2022

(87) PCT Pub. No.: WO2020/084999
PCT Pub. Date: Apr. 30, 2020

(65) Prior Publication Data
US 2022/0222773 A1    Jul. 14, 2022

(30) Foreign Application Priority Data
Oct. 25, 2018   (JP) .............................. JP2018-200558

(51) Int. Cl.
*G06T 3/40*    (2006.01)
*G06T 5/50*    (2006.01)

(52) U.S. Cl.
CPC .................. *G06T 3/40* (2013.01); *G06T 5/50* (2013.01); *G06T 2207/20016* (2013.01); *G06T 2207/20224* (2013.01)

(58) Field of Classification Search
None
See application file for complete search history.

(56) References Cited

U.S. PATENT DOCUMENTS

| 9,955,084 B1* | 4/2018 | Haynold | ................... G06T 5/50 |
| 2005/0024535 A1* | 2/2005 | Tatemori | ................... G09G 5/00 |
| | | | 348/E5.111 |

(Continued)

FOREIGN PATENT DOCUMENTS

| CN | 101822037 A | 9/2010 |
| CN | 104184929 A | 12/2014 |

(Continued)

OTHER PUBLICATIONS

R. Grajeda-Marń, A New Optimization Strategy for Solving the Fall-Off Boundary Value Problem in Pixel-Value Differencing Steganography,Published Jul. 27, 2017,World Scientifc Publishing Company DOI: 10.1142/S0218001418600108;International Journal of Pattern Recognition and Artificial Intelligencce (Year: 2017).*

(Continued)

*Primary Examiner* — Matthew C Bella
*Assistant Examiner* — Rumana Khandekar
(74) *Attorney, Agent, or Firm* — Chip Law Group

(57) ABSTRACT

Provided is an image analysis unit that receives an image to be a down-conversion processing target as an input and generate adjacent pixel difference information used to select a pixel to be output to a down-converted image, and an output image generation unit that selects a pixel pair to be an adjacent pixel used for the down-converted image on the basis of the adjacent pixel difference information and generate the down-converted image by executing an adjustment of the selected pixel pair. The image analysis unit calculates a difference of an adjacent pixel pair of a processing block constituent pixel, generates a sorting result of arranging the differences in descending order, and the output image generation unit selects the pixel pair to be used for the down-converted image in descending order of difference values on the basis of the sorting result.

14 Claims, 22 Drawing Sheets

(56) References Cited

U.S. PATENT DOCUMENTS

| | | | |
|---|---|---|---|
| 2007/0268400 A1* | 11/2007 | Kondo | H04N 7/0125 |
| | | | 348/E7.016 |
| 2009/0207310 A1* | 8/2009 | Arai | G06T 3/40 |
| | | | 348/581 |
| 2009/0256925 A1* | 10/2009 | Yoshizumi | H04N 5/23219 |
| | | | 348/222.1 |
| 2011/0199394 A1 | 8/2011 | Toraichi et al. | |
| 2012/0182452 A1* | 7/2012 | Yasu | H04N 5/367 |
| | | | 348/246 |
| 2013/0021483 A1* | 1/2013 | Bennett | H04N 5/23267 |
| | | | 348/208.4 |
| 2013/0129257 A1* | 5/2013 | Hammond | G06T 3/403 |
| | | | 382/298 |
| 2014/0347557 A1* | 11/2014 | Gomita | H04N 7/0117 |
| | | | 348/441 |
| 2015/0178932 A1* | 6/2015 | Wyatt | H04N 19/436 |
| | | | 707/748 |
| 2017/0236260 A1* | 8/2017 | Budagavi | G06T 5/50 |
| | | | 382/275 |
| 2020/0112670 A1* | 4/2020 | Kamiya | H04N 1/387 |

FOREIGN PATENT DOCUMENTS

| | | | |
|---|---|---|---|
| EP | 2190179 A1 | 5/2010 | |
| JP | 2004-312765 A | 11/2004 | |
| JP | 2009-049562 A | 3/2009 | |
| JP | 2014-230176 A | 12/2014 | |
| WO | 2009/022690 A1 | 2/2009 | |
| WO | 2018/168571 A1 | 9/2018 | |
| WO | WO-2018168571 A1 * | 9/2018 | G03B 13/02 |

OTHER PUBLICATIONS

International Search Report and Written Opinion of PCT Application No. PCT/JP2019/037881, dated Nov. 19, 2019, 08 pages of ISRWO.

* cited by examiner

FIG. 3

IMAGE PROCESSING APPARATUS AND IMAGE PROCESSING METHOD

CROSS REFERENCE TO RELATED APPLICATIONS

This application is a U.S. National Phase of International Patent Application No. PCT/JP2019/037881 filed on Sep. 26, 2019, which claims priority benefit of Japanese Patent Application No. JP 2018-200558 filed in the Japan Patent Office on Oct. 25, 2018. Each of the above-referenced applications is hereby incorporated herein by reference in its entirety.

TECHNICAL FIELD

The present disclosure relates to image processing apparatuses, image processing methods, and programs. More particularly, the present disclosure relates to an image processing apparatus, an image processing method, and a program, which execute down-conversion of an image.

BACKGROUND ART

In one example, there is a case where a high-resolution image captured by a camera is output and displayed on a display unit of a camera or a display unit such as an external monitor of a television, a PC, or the like. In this case, it is necessary to perform image down-conversion to reduce the number of pixels of the captured image to the number of pixels that can be output to the display unit. Besides, the image down-conversion is sometimes performed to reduce the data capacity even in storing it in the storage unit.

Most of the related arts disclosed regarding the image down-conversion are intended to reduce the variation in image quality before and after conversion.

In one example, Patent Document 1 (JP 2004-312765 A) discloses a configuration that executes processing of applying an averaging filter for averaging pixel values of a plurality of pixels to a high-resolution image to be down-converted or executes pixel decimation processing to generate a down-converted image with reduced deterioration in image quality.

However, such averaging or decimation of multiple pixels will cause the contrast or texture of an original image before down-conversion to deteriorate in many cases. Upon displaying the resultant image on a display unit, the displayed image is blurry, deteriorating the image quality.

Further, the focus adjustment upon capturing an image with a camera is often performed on the basis of the contrast of the image. In one example, in addition to the manual adjustment by the user who views an image and sets a point where the contrast is maximized to the focus point, the contrast autofocus (AF), which is auto focus adjustment, is often used. However, the use of a down-converted image with deteriorated contrast has a problem that it makes accurate focus adjustment difficult.

CITATION LIST

Patent Document

Patent Document 1: Japanese Patent Application Laid-Open No. 2004-312765

SUMMARY OF THE INVENTION

Problems to be Solved by the Invention

The present disclosure is made, in one example, in view of the above problems. The present disclosure is intended to provide an image processing apparatus, an image processing method, and a program, capable of generating a down-converted image without significantly compromising the contrast or texture of a high-resolution image before down-conversion.

Solutions to Problems

A first aspect of the present disclosure is an image processing apparatus including:

an image analysis unit configured to receive an image to be a down-conversion processing target as an input and generate adjacent pixel difference information used to select a pixel to be output to a down-converted image; and an output image generation unit configured to select a pixel pair to be an adjacent pixel used for the down-converted image on the basis of the adjacent pixel difference information generated by the image analysis unit and generate the down-converted image on the basis of the selected pixel pair.

Further, a second aspect of the present disclosure is an image processing method executed in an image processing apparatus, the image processing method including:

an image analysis step of, by an image analysis unit, receiving an image to be a down-conversion processing target as an input and generating adjacent pixel difference information used to select a pixel to be output to a down-converted image; and an output image generation step of, by an output image generation unit, selecting a pixel pair to be an adjacent pixel used for the down-converted image on the basis of the adjacent pixel difference information generated in the image analysis step and generating the down-converted image on the basis of the selected pixel pair.

Further, a third aspect of the present disclosure is a program causing an image processing apparatus to execute image processing, the program including:

an image analysis step of causing an image analysis unit to receive an image to be a down-conversion processing target as an input and to generate adjacent pixel difference information used to select a pixel to be output to a down-converted image; and an output image generation step of causing an output image generation unit to select a pixel pair to be an adjacent pixel used for the down-converted image on the basis of the adjacent pixel difference information generated in the image analysis step and to generate the down-converted image on the basis of the selected pixel pair.

Note that the program of the present disclosure is, in one example, a program accessible as a storage medium or a communication medium provided in a non-transitory computer-readable form to an information processing apparatus or a computer system capable of executing various program codes. Such a program provided in the non-transitory computer-readable form makes it possible for the processing in accordance with the program to be implemented on the information processing apparatus or the computer system.

Still other objects, features, and advantages of the present disclosure will become apparent from a detailed description based on embodiments of the present disclosure as described later and accompanying drawings. Note that the term "system" herein refers to a logical component set of a plurality of apparatuses and is not limited to a system in which apparatuses of the respective components are provided in the same housing.

Effects of the Invention

The configuration of one embodiment of the present disclosure allows achieving an apparatus and a method of generating a down-converted image that does not significantly compromise the contrast or texture information of an original image.

Specifically, for example, it includes an image analysis unit configured to receive an image to be a down-conversion processing target as an input and generate adjacent pixel difference information used to select a pixel to be output to a down-converted image, and an output image generation unit configured to select a pixel pair to be an adjacent pixel used for the down-converted image on the basis of the adjacent pixel difference information and generate the down-converted image by executing an adjustment of the selected pixel pair. The image analysis unit calculates a difference of an adjacent pixel pair of a processing block constituent pixel, generates a sorting result of arranging the differences in descending order, and the output image generation unit selects the pixel pair to be used for the down-converted image in descending order of difference values on the basis of the sorting result.

These processes allow achieving an apparatus and a method of generating a down-converted image that does not significantly compromise the contrast or texture information of an original image.

Note that the effects described in the present specification are merely examples and are not limited, and there may be additional effects.

BRIEF DESCRIPTION OF DRAWINGS

FIG. 3 is a diagram illustrating an example of an image processed in the image analysis unit.

MODE FOR CARRYING OUT THE INVENTION

Figure 1:
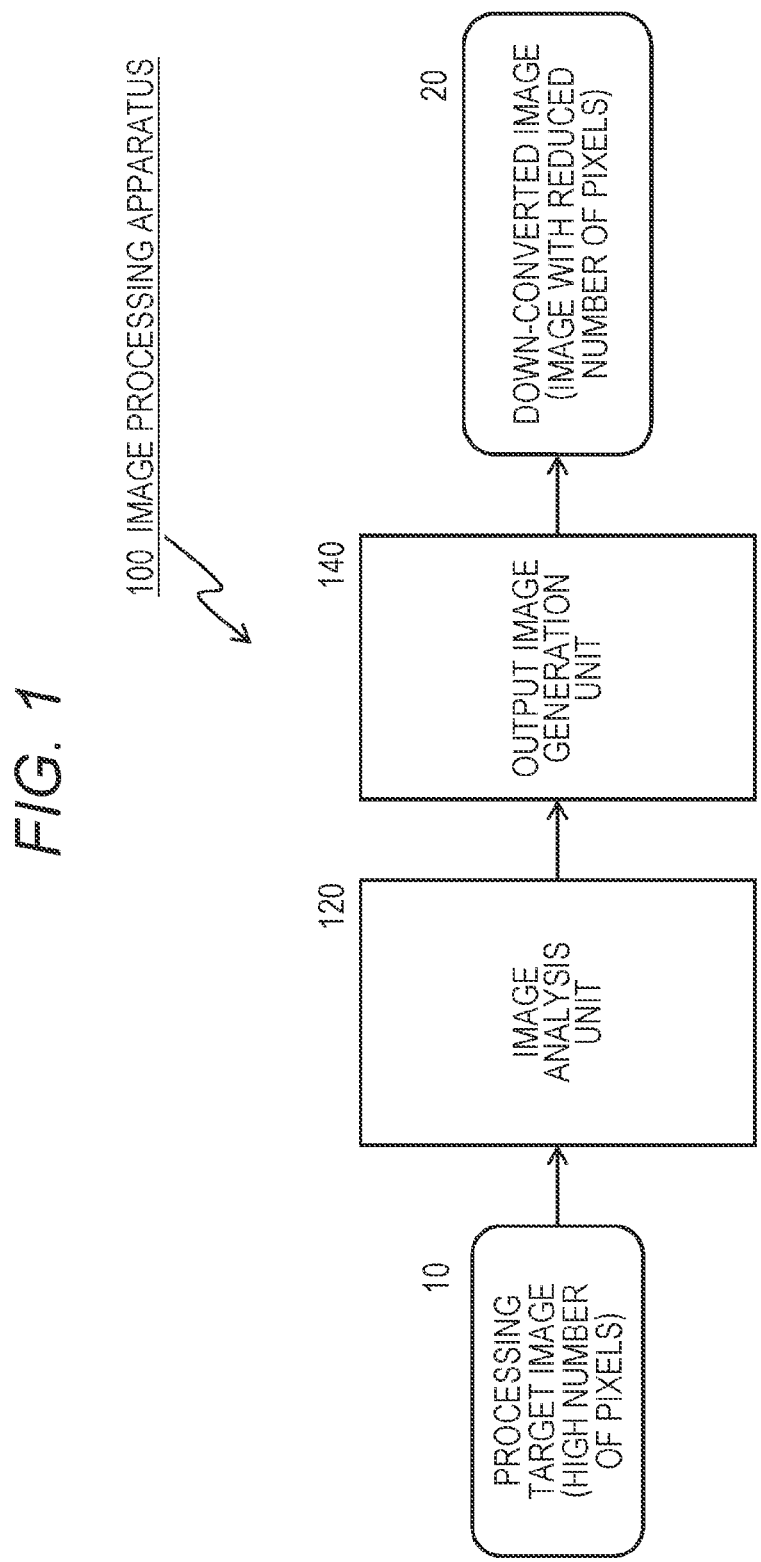
FIG. 1 is a diagram illustrating a configuration of an image processing apparatus of the present disclosure.

Hereinafter, description will be given with reference to the drawings on the image processing apparatuses, the image processing methods, and the programs according to the present disclosure. Note that description will be provided in the following order.

1. Overview of overall configuration and processing of image processing apparatus of the present disclosure
2. Details of configuration and processing of image analysis unit
3. Details of configuration and processing of output image generation unit
4. Exemplary configuration of image processing apparatus of the present disclosure applied to imaging apparatus
5. Hardware configuration example of image processing apparatus of the present disclosure
6. Application examples
7. Summary of configuration of the present disclosure 1. Overview of Overall Configuration and Processing of Image Processing Apparatus of the Present Disclosure An overview of the overall configuration and processing of an image processing apparatus of the present disclosure is now described with reference to FIG. 1.

FIG. 1 is a block diagram showing the overall configuration of an image processing apparatus 100 of the present disclosure.

Moreover, the image processing apparatus illustrated in FIG. 1 can be configured as specifically a signal processing unit inside, in one example, a camera. Alternatively, it can also be configured as an image processing apparatus that generates an image to be displayed on a display unit, such as a television or a PC that receives a camera-captured image and displays it on a display unit.

An overview of the configuration of the image processing apparatus 100 illustrated in FIG. 1 and the processing thereof is described.

The image processing apparatus 100 includes two large processing blocks as illustrated in FIG. 1. The blocks are an image analysis unit 120 and an output image generation unit 140.

The image processing apparatus 100, in one example, receives a processing target image 10 that is an image captured by a camera having an image sensor with a high pixel count as an input. Then, the image processing apparatus 100 causes the image analysis unit 120 and the output image generation unit 140 to process it so that a down-converted image 20 with a reduced number of pixels is generated and output.

The down-converted image 20 generated by the image processing apparatus 100 is displayed on, for example, a monitor of a camera or a display unit of a television, a PC, or the like. Alternatively, it is stored in a storage unit.

In addition, in the case where the image processing apparatus 100 is provided in a signal processing unit of a camera, the down-converted image 20 generated by the image processing apparatus 100 is also usable for focus adjustment based on the image contrast. In one example, it is usable for contrast AF or the like.

The down-converted image 20 generated by the image processing apparatus 100 of the present disclosure does not significantly compromise the contrast or texture information before down-conversion, so achieving highly accurate focus adjustment.

The image analysis unit 120 of the image processing apparatus 100 illustrated in FIG. 1 mainly executes processing of generating information necessary for selecting a pixel to be used as a constituent pixel of the down-converted image 20 to be output.

The image analysis unit 120 receives the processing target image 10 as an input and generates the information used for selecting a pixel to be used as a constituent pixel of the down-converted image 20, specifically, pixel value difference information of adjacent pixels, in a predetermined pixel block unit.

The adjacent pixel difference information selected by the image analysis unit 120 is input to the output image generation unit 140.

The output image generation unit 140 selects a pixel to be used as a constituent pixel of the down-converted image 20 on the basis of the adjacent pixel difference information generated by the image analysis unit 120. Furthermore, processing such as adjustment of a pixel value of the selected pixel candidate is executed and a pixel value of the constituent pixel of the down-converted image 20 is determined.

Figure 2:
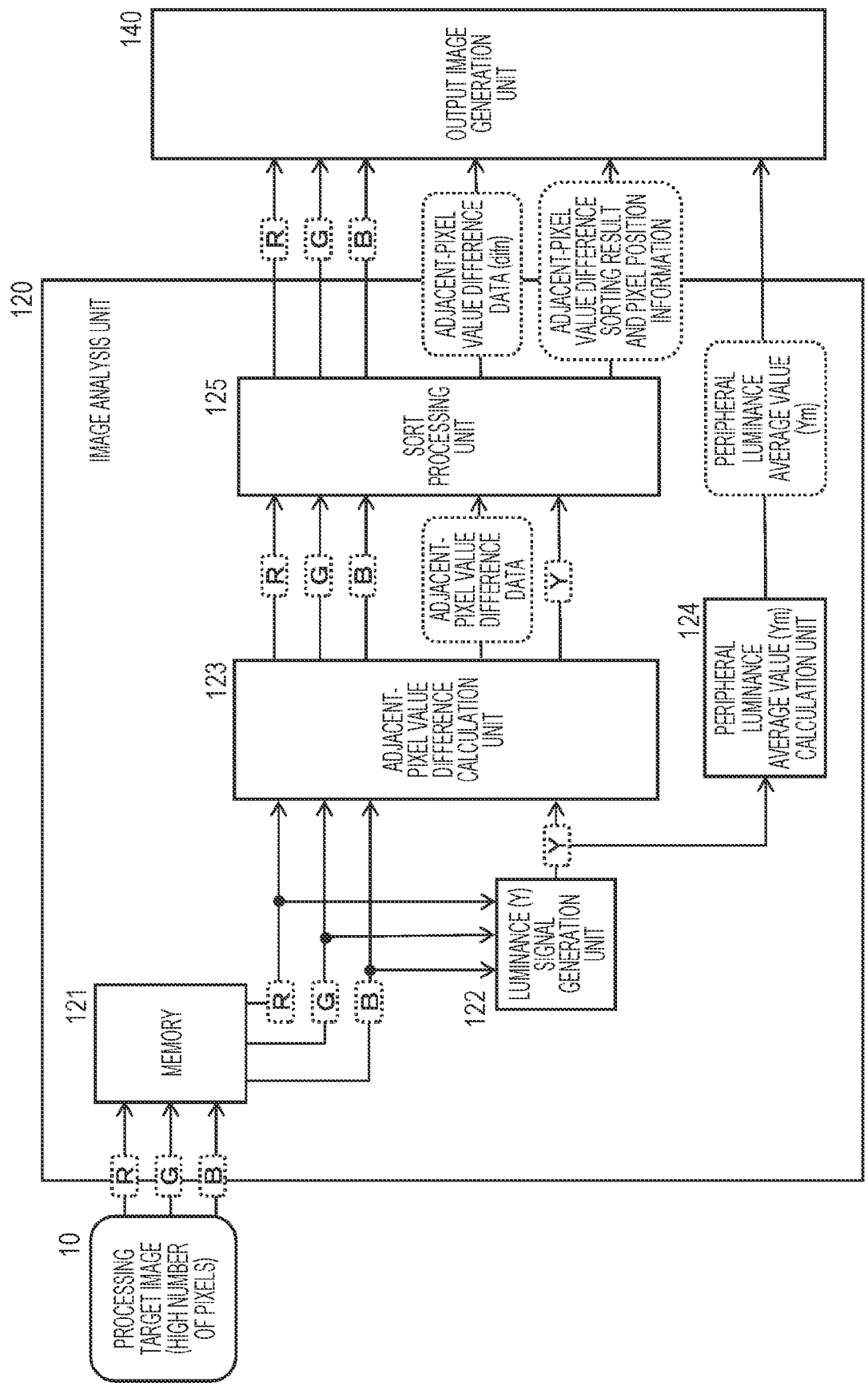
FIG. 2 is a diagram illustrating a configuration and processing of an image analysis unit.

The description is now given of the detailed configuration of the image analysis unit 120 and the output image generation unit 140 of the image processing apparatus 100 illustrated in FIG. 1 and their processing with reference to FIG. 2 and the following drawings.

2. Details of Configuration and Processing of Image Analysis Unit

The description is now given of the detailed configuration of the image analysis unit 120 of the image processing apparatus 100 illustrated in FIG. 1 and its processing with reference to FIG. 2 and the following drawings.

FIG. 2 is a block diagram showing the detailed configuration of the image analysis unit 120 of the image processing apparatus 100 illustrated in FIG. 1.

The image analysis unit 120 first stores the processing target image 10 in a memory 121.

Moreover, the processing target image 10 is an image in which RGB pixel values are set for each pixel. But this is an example of the processing target image 10. The processing target image 10 processed by the image processing apparatus 100 can be an image in which other pixel values such as YCbCr other than the RGB image are set. Exemplary processing in the case where the processing target image 10 is an RGB image is now described.

A luminance signal generation unit 122 generates a luminance (Y) signal corresponding to each pixel of the processing target image 10 stored in the memory 121. It is possible to execute the conversion from the RGB signal to the Y signal by applying the existing conversion formula (Y=f(R, G, B)).

An adjacent-pixel value difference calculation unit 123 receives the RGB signal of each pixel of the RGB image that is the processing target image 10 stored in the memory 121 and receives the Y (luminance) signal corresponding to each pixel from the luminance signal generation unit 122 as an input.

Figure 3:
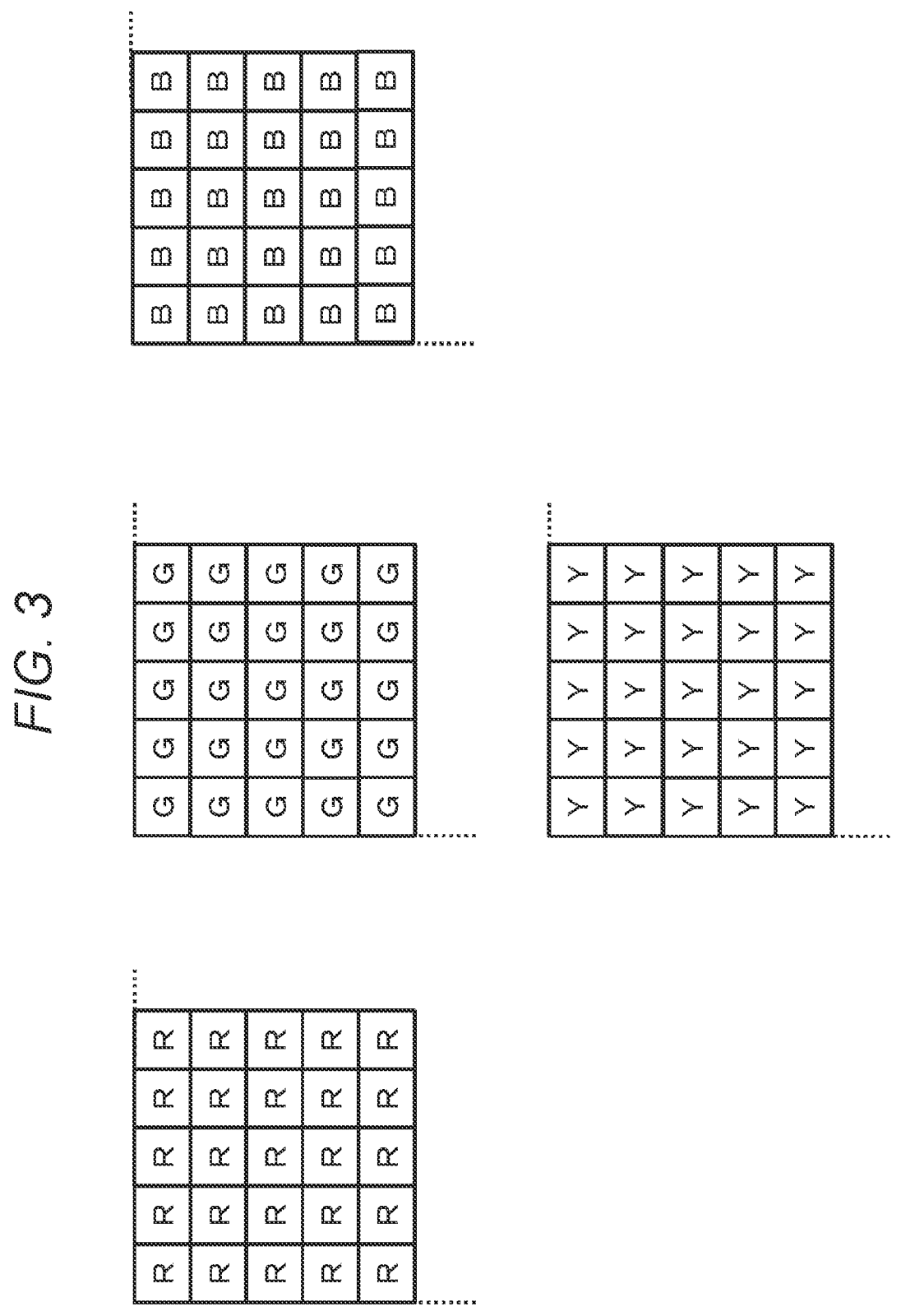

In other words, the signal input to the adjacent-pixel value difference calculation unit 123 is, for example, each RGBY signal corresponding to each pixel as illustrated in FIG. 3.

The adjacent-pixel value difference calculation unit 123 and the following components, that is, the adjacent-pixel value difference calculation unit 123 and a sort processing unit 125 of the image analysis unit 120, and the output image generation unit 140 in the subsequent stage execute processing operations described below. These processing operations are executed sequentially or in parallel for each RGB signal of each pixel of the RGB image, which is the processing target image 10.

The Y (luminance) signal corresponding to each pixel generated by the luminance signal generation unit 122 is a supplementary signal used in processing each RGB signal.

An embodiment described below is an embodiment in which the luminance signal generation unit 122 generates the Y (luminance) signal and the generated Y signal is commonly applied to the processing of each RGB signal.

However, the Y (luminance) signal is not necessarily generated and used, and the RGB signal itself can be used instead of the Y (luminance) signal for processing.

The adjacent-pixel value difference calculation unit 123 calculates a difference between the RGB signals or the Y (luminance) signals corresponding to each pixel.

In the case where the Y (luminance) signal is used, the difference between the Y (luminance) signals is calculated.

In the case where the Y (luminance) signal is not used, the difference signal of any of the RGB signals to be processed is calculated.

Moreover, the description below is given of an embodiment in which the Y (luminance) signal is generated and the generated Y signal is used for processing each RGB signal.

In this embodiment, the adjacent-pixel value difference calculation unit 123 receives the Y (luminance) signal corresponding to each pixel from the luminance signal generation unit 122 as an input and calculates the difference between the Y (luminance) signals of the adjacent pixels.

Moreover, the pixel value difference (luminance value difference) of adjacent pixels is calculated depending on the down-conversion ratio. As an example, the description is given of an example of pixel value difference calculation processing in the case where the down-conversion ratio is 2:1.

In addition, an adjacent pixel to be calculated as a pixel value difference is selected on the basis of three types of selection modes as follows:
 adjacent pixels in vertical direction;
 adjacent pixels in horizontal direction; and
 adjacent pixels in diagonal direction.

Moreover, in selecting a plurality of adjacent pixels, any one of the selection modes described above can be used, or a plurality of types of selection modes can be used in combination.

Figure 4:
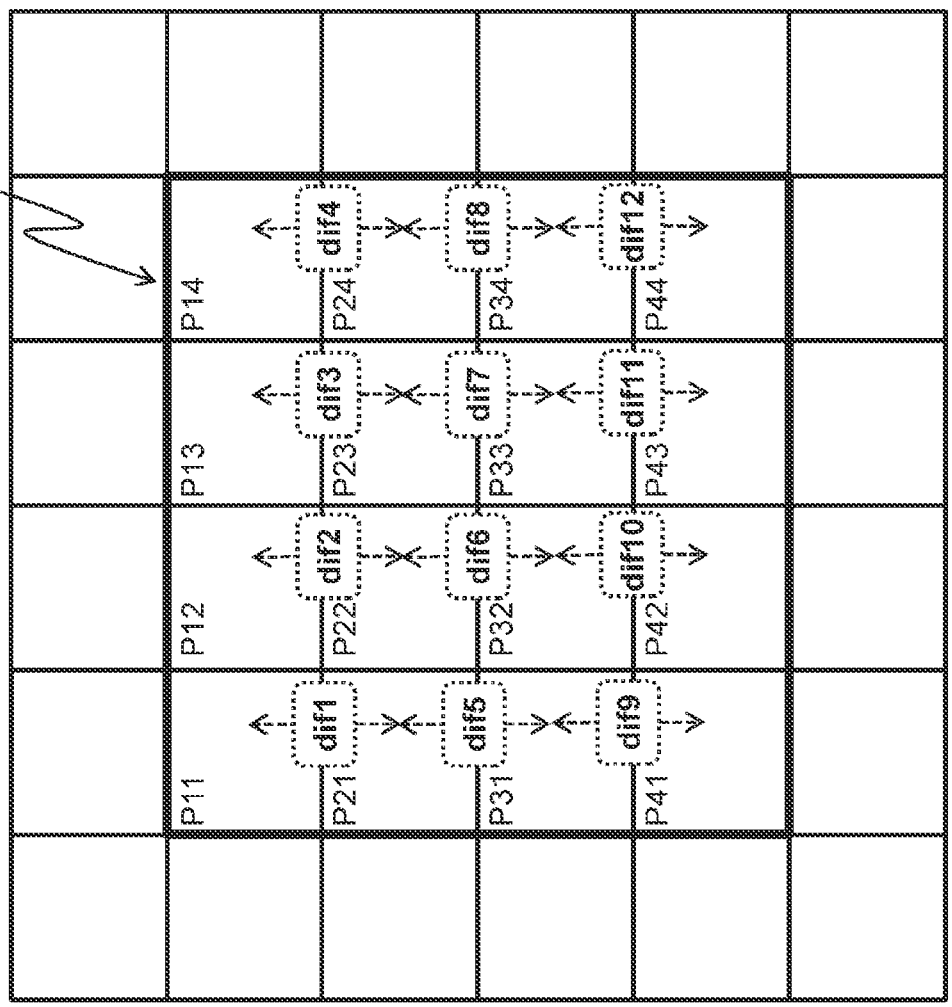
FIG. 4 is a diagram illustrating an example of difference calculation processing of adjacent pixels executed by an image analysis unit.

FIG. 4 is a diagram showing an example of setting a difference calculation pixel in the case where adjacent pixels in the vertical direction are set as the difference calculation target.

The adjacent-pixel value difference calculation unit 123 performs processing in units of predetermined processing blocks. An example in which 4×4 pixels are used as one processing unit (processing block) is illustrated in FIG. 4.

The adjacent-pixel value difference calculation unit 123 calculates all the differences between the adjacent pixels in the vertical direction for a plurality of pixels included in one processing block. In this example, the difference between the luminance (Y) signals is calculated.

As illustrated in FIG. 4, the processing block of 4×4 pixels includes 4×4=16 pixels, and the calculation of all the differences between the adjacent pixels in the vertical direction for these 16 pixels allows for calculating 12 pieces of difference data (dif1 to dif12).

Figure 5:
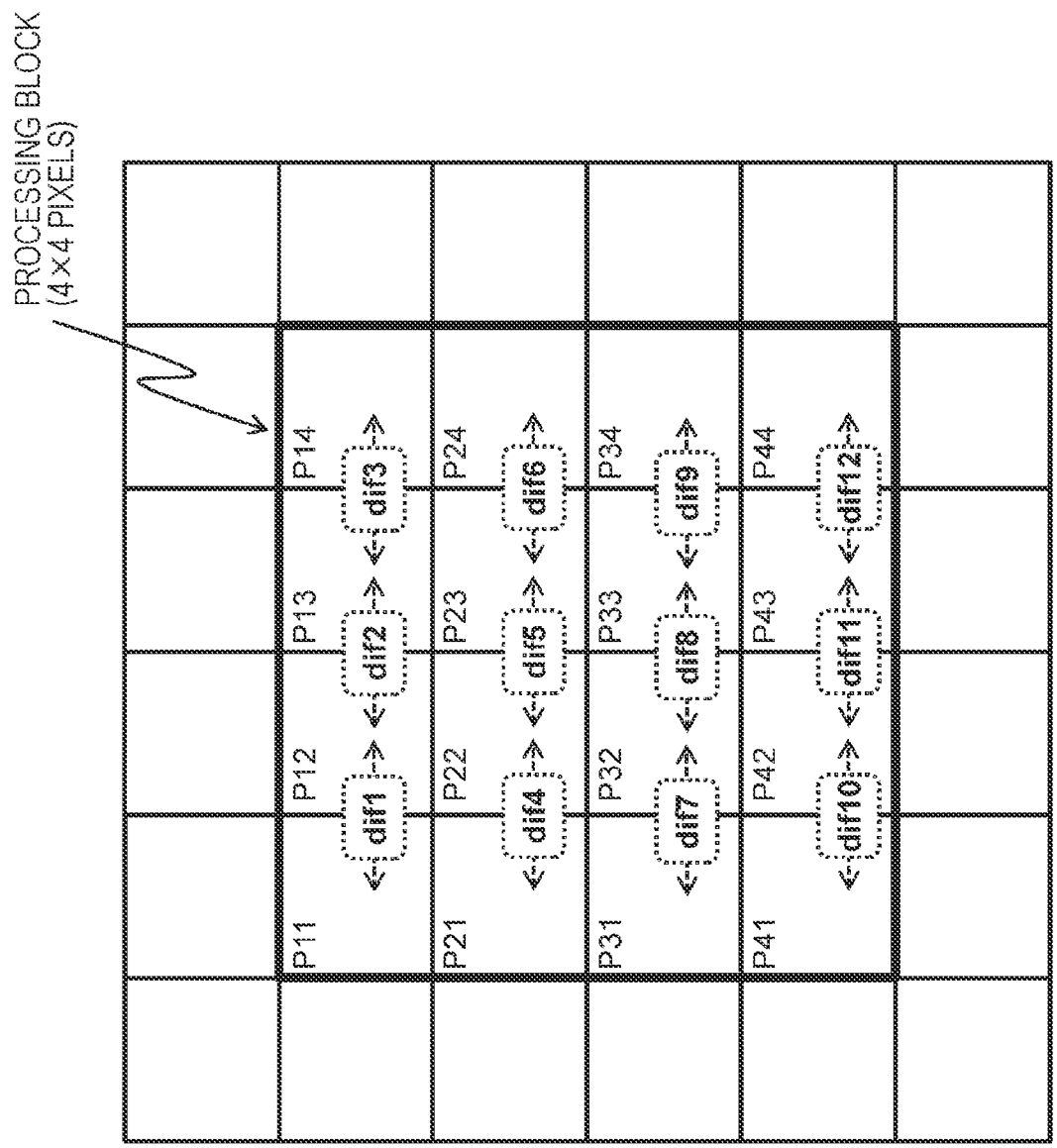
FIG. 5 is a diagram illustrating an example of difference calculation processing of adjacent pixels executed by an image analysis unit.

FIG. 5 is a diagram showing an example of setting a difference calculation pixel in the case where adjacent pixels in the horizontal direction are set as the difference calculation target.

As illustrated in FIG. 5, the calculation of all the differences between the adjacent pixels in the horizontal direction for 16 pixels of the processing block of 4×4 pixels allows for calculating 12 pieces of difference data (dif1 to dif12).

Figure 6:
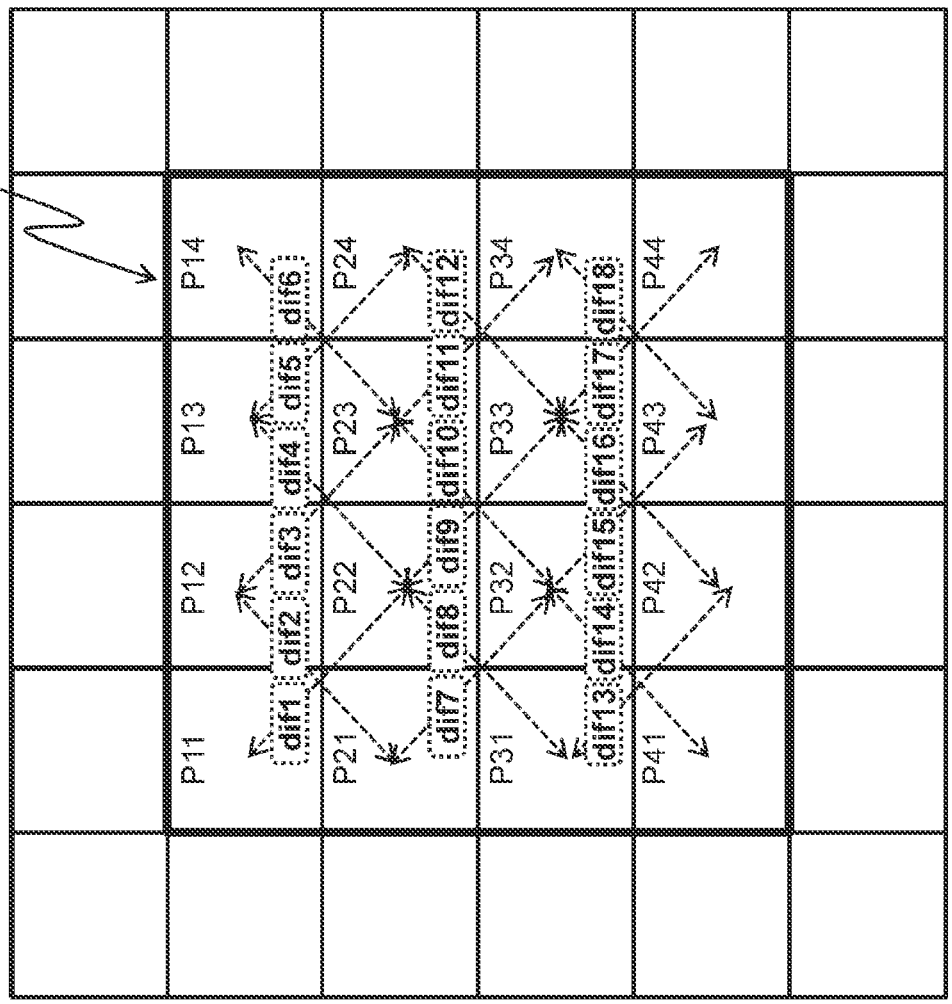
FIG. 6 is a diagram illustrating an example of difference calculation processing of adjacent pixels executed by an image analysis unit.

FIG. 6 is a diagram showing an example of setting a difference calculation pixel in the case where adjacent pixels in the diagonal direction are set as the difference calculation target.

As illustrated in FIG. 6, the calculation of all the differences between the adjacent pixels in the diagonal direction for 16 pixels of the processing block of 4×4 pixels allows for calculating 18 pieces of difference data (dif1 to dif18).

The user is able to set as to whether the difference calculation target is the adjacent pixel in the vertical direction, the adjacent pixel in the left-right direction, or the adjacent pixel in the diagonal direction. Although an input unit is not shown in FIGS. 1 and 2, for example, the user is able to input setting information via an input unit such as a user IF configured as a touch panel or the like provided on a display unit of a camera. The same applies to the size of the processing block, and the user can set it to any size. The user is also able to perform processing such as switching the setting, for example, while observing the down-converted image displayed on the display unit.

Moreover, the default setting information or the setting information that is set finally by the user is stored in a memory of a camera. If there is no additional user input, the processing is executed in accordance with the setting stored in this memory.

The description is now given of exemplary processing in which the processing block is set to 4×4 pixels and the processing is executed on the condition of setting the adjacent pixels in the vertical direction as the difference calculation target.

As described above with reference to FIG. 4, the calculation of the pixel value difference on the condition that the processing block is set as 4×4 pixels and the adjacent pixels in the vertical direction are set to the difference calculation target allows for calculating 12 pieces of difference data (dif1 to dif12).

The adjacent-pixel value difference calculation unit 123 calculates the 12 pieces of difference data (dif1 to dif12) and inputs the calculated data to the sort processing unit 125. It is "adjacent-pixel value difference data" illustrated in FIG. 2.

The sort processing unit 125 receives, as an input, the RGB pixel value data of the processing target image 10, the luminance (Y) signal corresponding to each pixel generated by the luminance signal generation unit 122, and the "adjacent-pixel value difference data" calculated by the adjacent-pixel value difference calculation unit 123.

The sort processing unit 125 executes sort processing of the "adjacent-pixel value difference data" using the "adjacent-pixel value difference data" calculated by the adjacent-pixel value difference calculation unit 123.

Moreover, the processing is executed in units of processing blocks. That is, the processing block of 4×4 pixels illustrated in FIG. 4.

The sort processing unit 125 executes the sort processing in which the 12 pieces of difference data (dif1 to dif12) that are the adjacent-pixel value difference data in the vertical direction obtained from the processing block of 4×4 pixels described with reference to FIG. 4 are arranged in descending order of difference values.

Moreover, the sort processing mode includes two processing modes as follows:
 (1) Sort processing that allows pixel duplication
 (2) Sort processing that does not allow pixel duplication
A specific example of these sort processing operations is described with reference to FIGS. 7 and 8.

Figure 7:
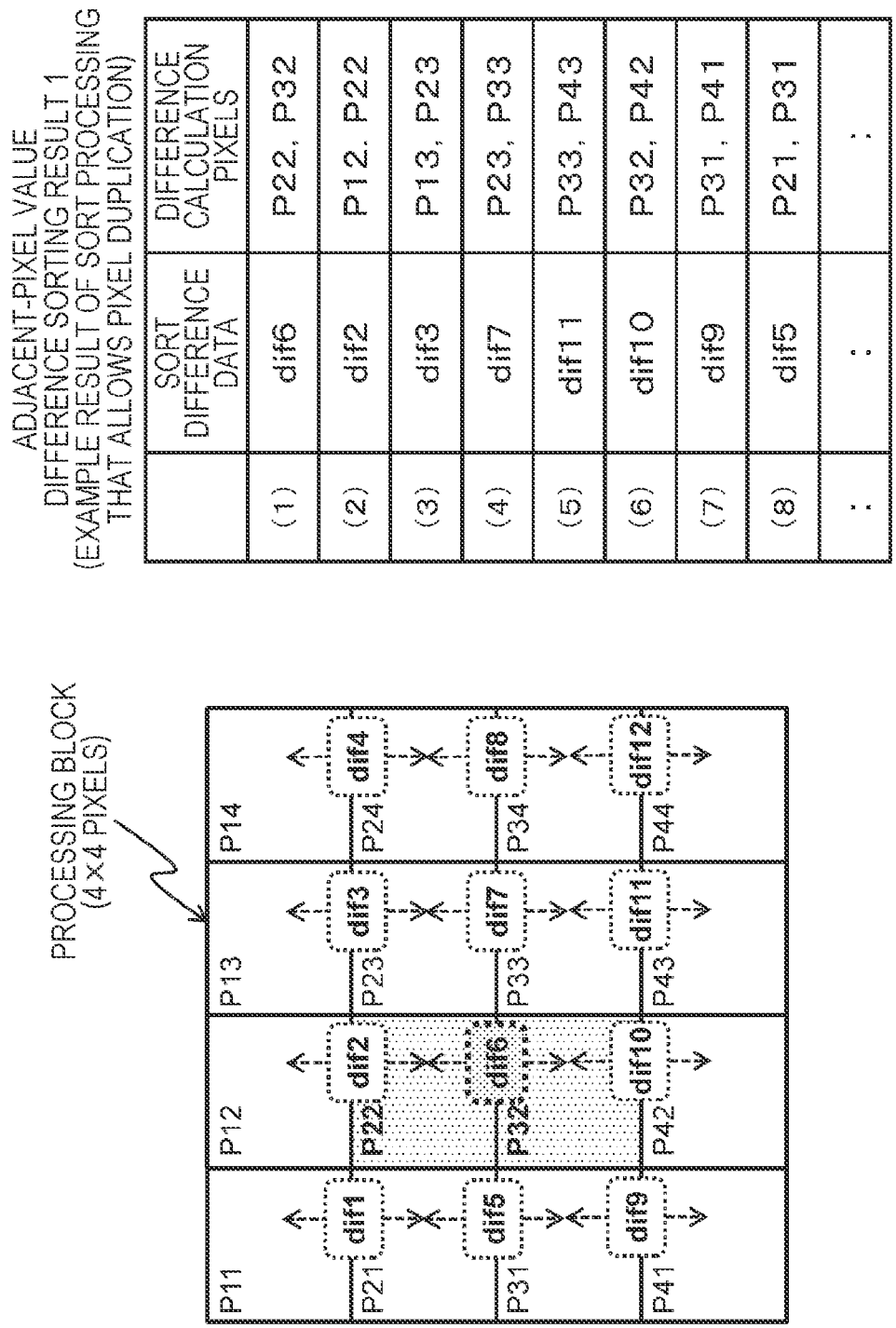
FIG. 7 is a diagram illustrating an example of processing of sorting results obtained by calculating a difference between adjacent pixels executed by the image analysis unit.

With reference to FIG. 7, "(1) Sort processing that allows pixel duplication" is now described.

The diagrammatic portion shown on the left side of FIG. 7 is a processing block having 4×4 pixels, similar to the processing block shown in FIG. 4. It shows 12 pieces of difference data (dif1 to dif12), which are adjacent-pixel value difference data in the vertical direction.

The table on the right side of FIG. 7 shows a result obtained by performing the sort processing in which 12 pieces of difference data (dif1 to dif12) are arranged in descending order of difference values. This sorting result is the result of "(1) Sort processing that allows pixel duplication".

This is the result in which 12 pieces of difference data (dif1 to dif12) are arranged in descending order of difference values.

The pieces of difference data (dif1 to dif12) are arranged in descending order of difference values, such as (1), (2), (3) . . . , in the table on the right side of FIG. 7.

A sort difference data item (difn) and difference calculation pixels Px and Py are recorded in each entry of (1), (2), (3) . . . shown in the table on the right side of FIG. 7. The difference calculation pixels Px and Py are a pair of adjacent pixels in the vertical direction in the processing block of 4×4 pixels shown on the left side of FIG. 7.

The "(1) Sort processing that allows pixel duplication" is the sorting processing of simply arranging 12 pieces of difference data (dif1 to dif12) in descending order of difference values.

Figure 8:
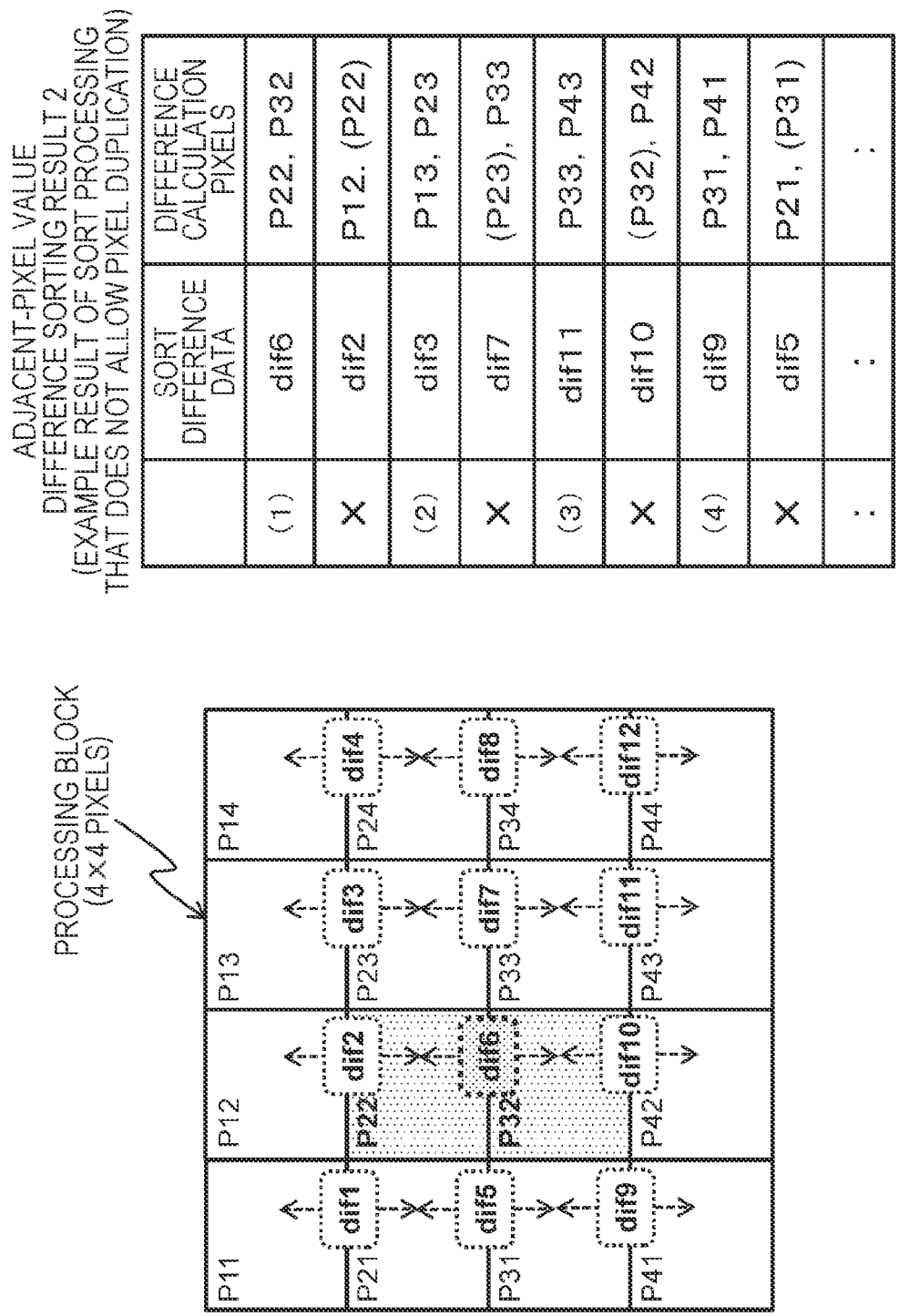
FIG. 8 is a diagram illustrating an example of processing of sorting results obtained by calculating a difference between adjacent pixels executed by the image analysis unit.

With reference to FIG. 8, "(2) Sort processing that does not allow pixel duplication" is then described.

The diagrammatic portion shown on the left side of FIG. 8 is a processing block having 4×4 pixels, similar to the processing block shown in FIG. 4. It shows 12 pieces of difference data (dif1 to dif12), which are adjacent-pixel value difference data in the vertical direction.

The table on the right side of FIG. 8 shows a result obtained by performing "(2) Sort processing that does not allow pixel duplication" for 12 pieces of difference data (dif1 to dif12).

The 12 pieces of difference data (dif1 to dif12) are first arranged in descending order of difference values and the difference calculation pixel of each entry of the result is analyzed. Then, the entry in which the pixel already used at the top of the sorting result is included as the difference calculation pixel is removed.

In one example, the difference calculation pixels of the entry in which the mark (x) that is the second from the top is set (difference: dif2) are P12 and P22. Of these two pixels, the pixel P22 is equal to the pixel P22 of P22 and P32 that are the calculation pixels of the difference (dif6) of the higher entry (1) in the sorting result.

In other words, the pixel P22 is the pixel that is already used as a higher difference calculation pixel in the sorting result.

In this way, in the higher data of the sorting result, the difference data in which the already used pixel is set as the difference calculation pixel is removed from the sorting result.

The entry set with mark (x) in the entries of the sorting result on the right side of FIG. 8 is the entry removed from the sorting result by this processing.

The sorting results remaining after such processing, that is, the entries (1), (2), (3) . . . in the table shown on the right side of FIG. 8, are the result obtained by executing "(2) Sort processing that does not allow pixel duplication".

Moreover, the sort processing to be executed by the sort processing unit 125 is set to one of the following:
(1) Sort processing that allows pixel duplication
(2) Sort processing that does not allow pixel duplication
and the user is able to set one of the settings (1) and (2) optionally. The setting information can be input via an input unit (e.g., user IF). The user is also able to perform processing such as switching the setting, for example, while observing the down-converted image displayed on the display unit.

The sorting result obtained from the execution by the sort processing unit 125 is input to the output image generation unit 140 together with the difference data (difn) and the pixel position information (Px, Py) as the difference calculation target.

The information input is the "adjacent-pixel value difference sorting result and pixel position information" illustrated in FIG. 2.

The processing executed by a peripheral luminance average value calculation unit 124 is now described with reference to FIG. 9.

The peripheral luminance average value calculation unit 124 calculates the average value (Ym) of the luminance of the peripheral pixels around the processing block in units of processing blocks.

Figure 9:
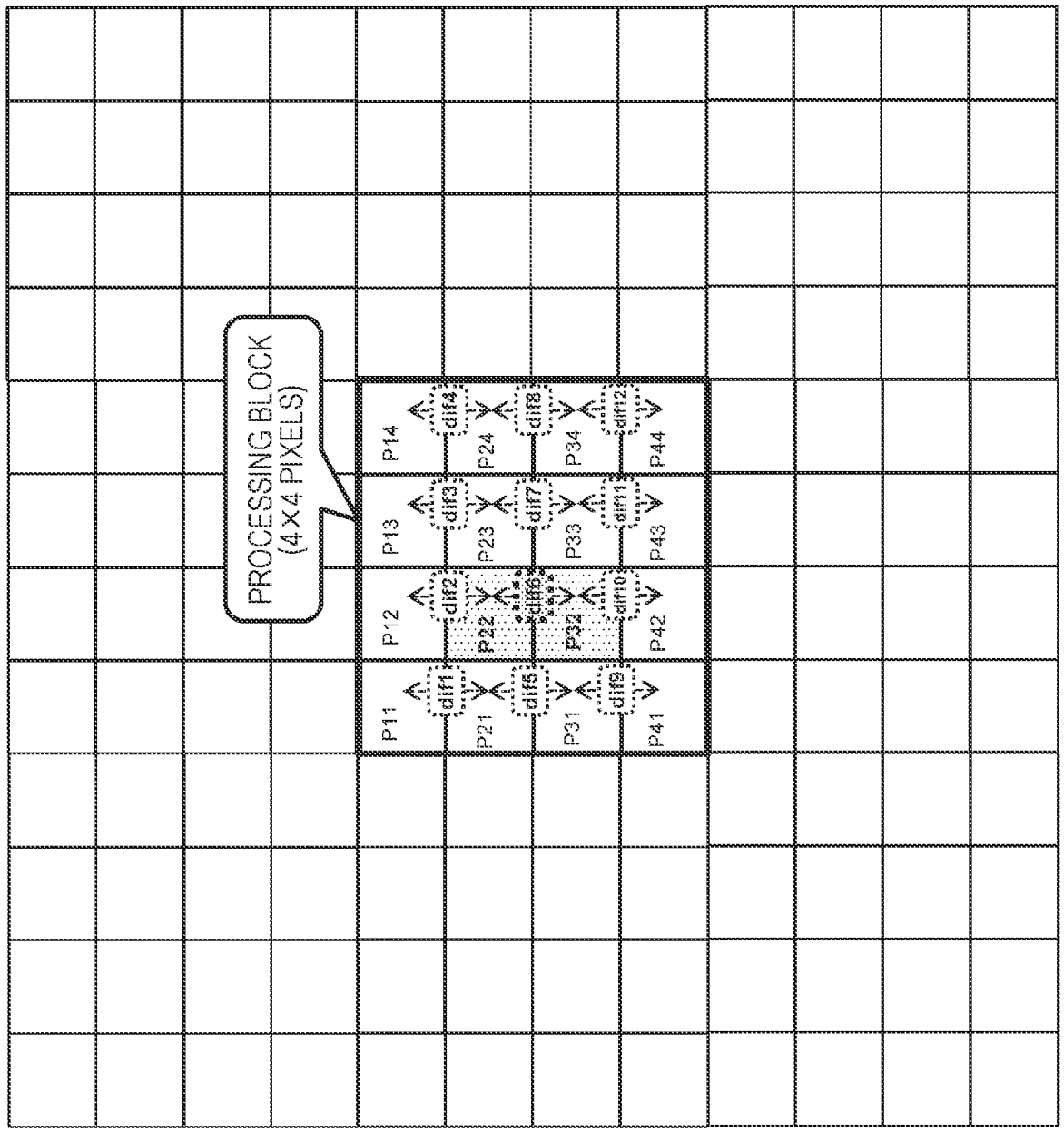
FIG. 9 is a diagram illustrating an example of peripheral luminance calculation processing executed by the image analysis unit.

FIG. 9 shows the surrounding 12×12 pixels centered on the processing block of 4×4 pixels. The peripheral luminance average value calculation unit 124 calculates, in one example, the average luminance of the pixel area of 12×12 pixels shown in FIG. 9 as a "peripheral luminance average value (Ym)" corresponding to the processing block of 4×4 pixels illustrated in FIG. 9.

In the example illustrated in FIG. 9, the average value (Ym) of the luminance values of 12×12=144 pixels shown in FIG. 9 is calculated, and this calculated value is used as the "peripheral luminance average value (Ym)" corresponding to the processing block of 4×4 pixels shown in FIG. 9.

Moreover, the user is also able to perform optional setting of the peripheral pixel areas for calculating the "peripheral luminance average value (Ym)". The setting information can be input via an input unit (e.g., user IF). The user is also able to perform processing such as switching the setting, for example, while observing the down-converted image displayed on the display unit.

As described above, the peripheral luminance average value calculation unit 124 calculates the average value (Ym) of the luminance of the peripheral pixels around the processing block in units of processing blocks and inputs the calculated "peripheral luminance average value (Ym)" to the output image generation unit 140.

As shown in FIG. 2, the data input to the output image generation unit 140 is as follows:
(1) RGB pixel value data of the processing target image 10,
(2) Peripheral luminance average value (Ym) calculated by the peripheral luminance average value calculation unit 124,
(3) "Adjacent-pixel value difference data (difn)" calculated by the adjacent-pixel value difference calculation unit 123, and
(4) "Adjacent-pixel value difference sorting result and pixel position information" generated by the sort processing unit 125.

3. Details of Configuration and Processing of Output Image Generation Unit

The details of the configuration of the output image generation unit and its processing are now described with reference to FIG. 10 and the following drawings.

Figure 10:
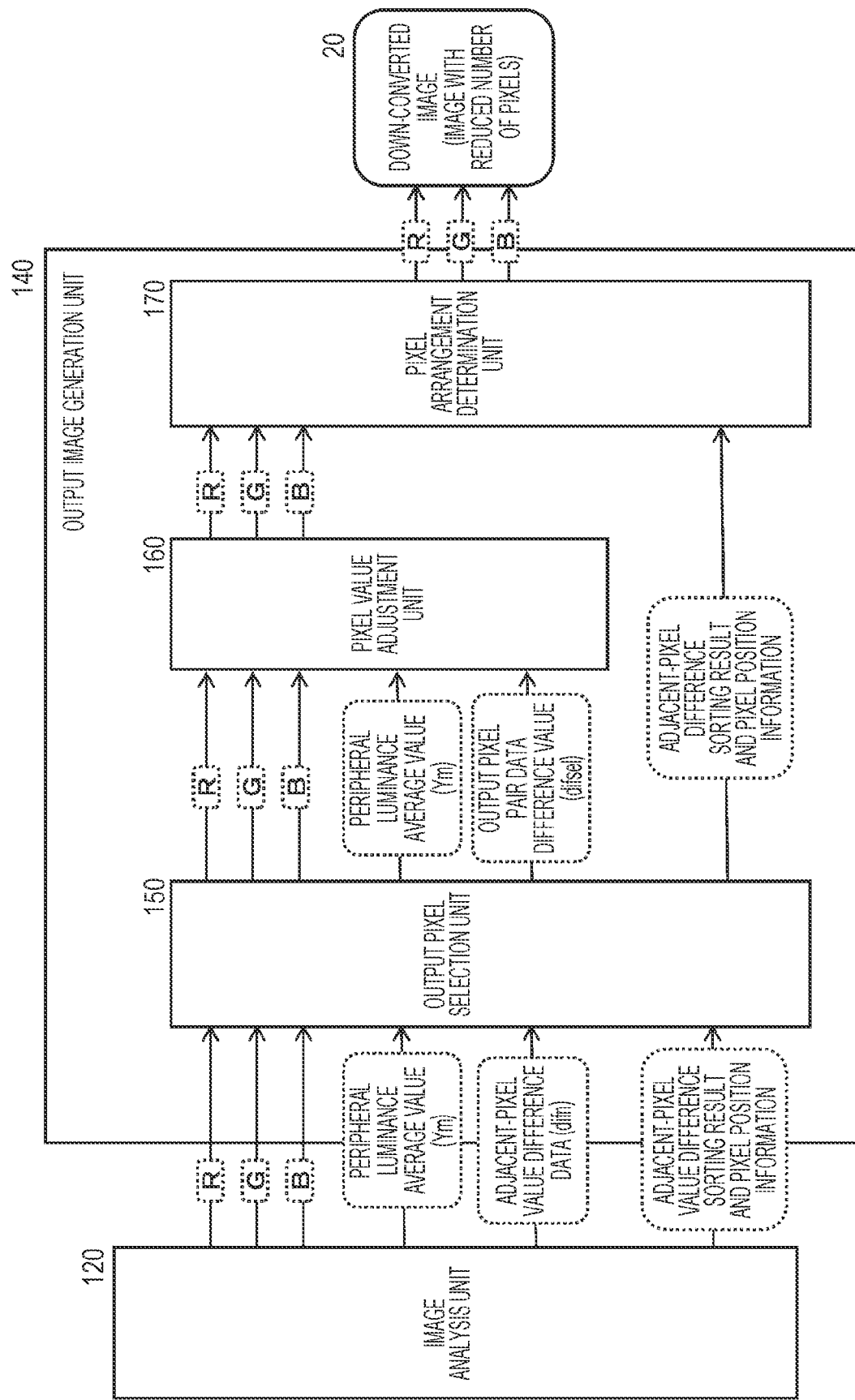
FIG. 10 is a diagram illustrating a configuration and processing of an output image generation unit.

FIG. 10 is a block diagram showing the detailed configuration of the output image generation unit 140 of the image processing apparatus 100 shown in FIG. 1.

The output image generation unit 140 includes an output pixel selection unit 150, a pixel value adjustment unit 160, and a pixel estimation determination unit 170.

The output image generation unit 140 first inputs information output from the image analysis unit 120 in the previous stage to the output pixel selection unit 150. The input information is as follows:
(1) RGB pixel value data of the processing target image 10,
(2) Peripheral luminance average value (Ym) calculated by the peripheral luminance average value calculation unit 124,
(3) "Adjacent-pixel value difference data (difn)" calculated by the adjacent-pixel value difference calculation unit 123, and
(4) "Adjacent-pixel value difference sorting result and pixel position information" generated by the sort processing unit 125.

The output pixel selection unit 150 first refers to the sorting result for each processing block of 4×4 pixels, that is, the "adjacent-pixel value difference sorting result and pixel position information" generated by the sort processing unit 125. The output pixel selection unit 150 determines which entry pixel pair is selected as the pixel (output pixel) to be used for the down-converted image 20.

Two methods used for the pixel pair selection processing by the output pixel selection unit 150, that is, the output pixel selection processing, are given as follows:

(1) Method of selecting any pair by user (2) Method of excluding a pixel pair to be used if its difference value (difn) is larger than a predetermined threshold value TH_S and selecting other pairs in descending order of difference values of the other pairs.

Moreover, the reason for excluding a pixel pair having a value larger than the predetermined threshold value TH_S in the method (2) is that a defective pixel is prevented from being selected. The defective pixel includes a defective pixel such as a pixel set with an erroneous pixel value that is entirely different from an actual subject in a processing block.

Basically, the processing of the method (2) above, that is, exclusion of a pixel pair to be used if it is larger than the predetermined threshold value TH_S and selection of other pairs in descending order are performed. This processing enables the contrast or texture information of the original image to be maintained.

It is basically preferable to perform the processing such as switching to the processing selected by the user in the method (1) if the execution of the processing of the method (2) is set and the selection information by the user is input.

Moreover, in the case of selecting by the user, the selection information can be input via an input unit (e.g., user IF). The user is also able to perform processing such as switching the selection setting, for example, while observing the down-converted image displayed on the display unit.

The number of pixel pairs selected in the pixel pair selection processing by the output pixel selection unit 150 is the number corresponding to the down-conversion ratio of the down-conversion processing executed by the image processing apparatus 100.

A specific example of the pixel pair selection processing by the output pixel selection unit 150 is described with reference to FIG. 11 and the following drawings.

Figure 11:
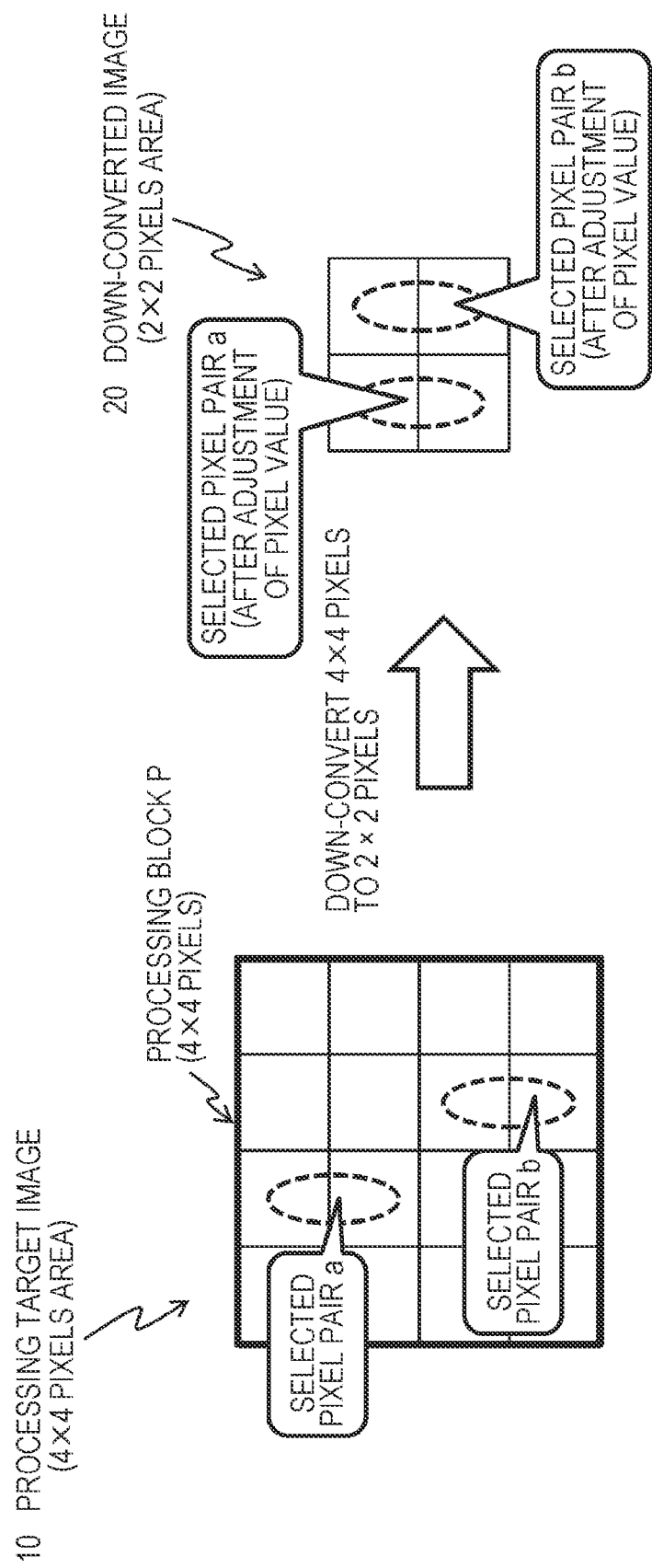
FIG. 11 is a diagram illustrating a specific example of pixel pair selection processing executed by the output image generation unit.

On the left side of FIG. 11, one processing block of the processing target image 10, that is, a processing block of 4×4 pixels is shown. The right side shows an area of 2×2 pixels, which is a partial image area of the down-converted image 20 after down-conversion by the image processing apparatus 100.

The example shown in FIG. 11 is an example of down-converting one processing block, that is, 4×4=16 pixels, of the processing target image 10, to 2×2=4 pixels.

In the case of performing such down-conversion processing, two pixel pairs are selected as the output pixel pair from one processing block of the processing target image 10, that is, the processing block of 4×4 pixels, which are pixel pairs a and b shown in the figure.

The four pixels constituting these two pixel pairs a and b are arranged in the area of 2×2 pixels, which is a partial image area of the down-converted image 20.

The output pixel selection unit 150 selects the pixel pair until a number of pixels to be used for the down-converted image 20 is reached.

However, the pixel values of the selected pixel pairs a and b are not set as they are but set to the constituent pixel values of the down-converted image 20 after executing the pixel value adjustment described later.

This processing allows the 4×4 pixel areas of the processing target image to be down-converted to the 2×2 pixels of the down-converted image 20.

Exemplary processing having a different down-conversion ratio is now described with reference to FIG. 12. The example shown in FIG. 12 is an example of down-converting 8×8=64 pixels of the processing target image 10 to 2×2=4 pixels.

Figure 12:
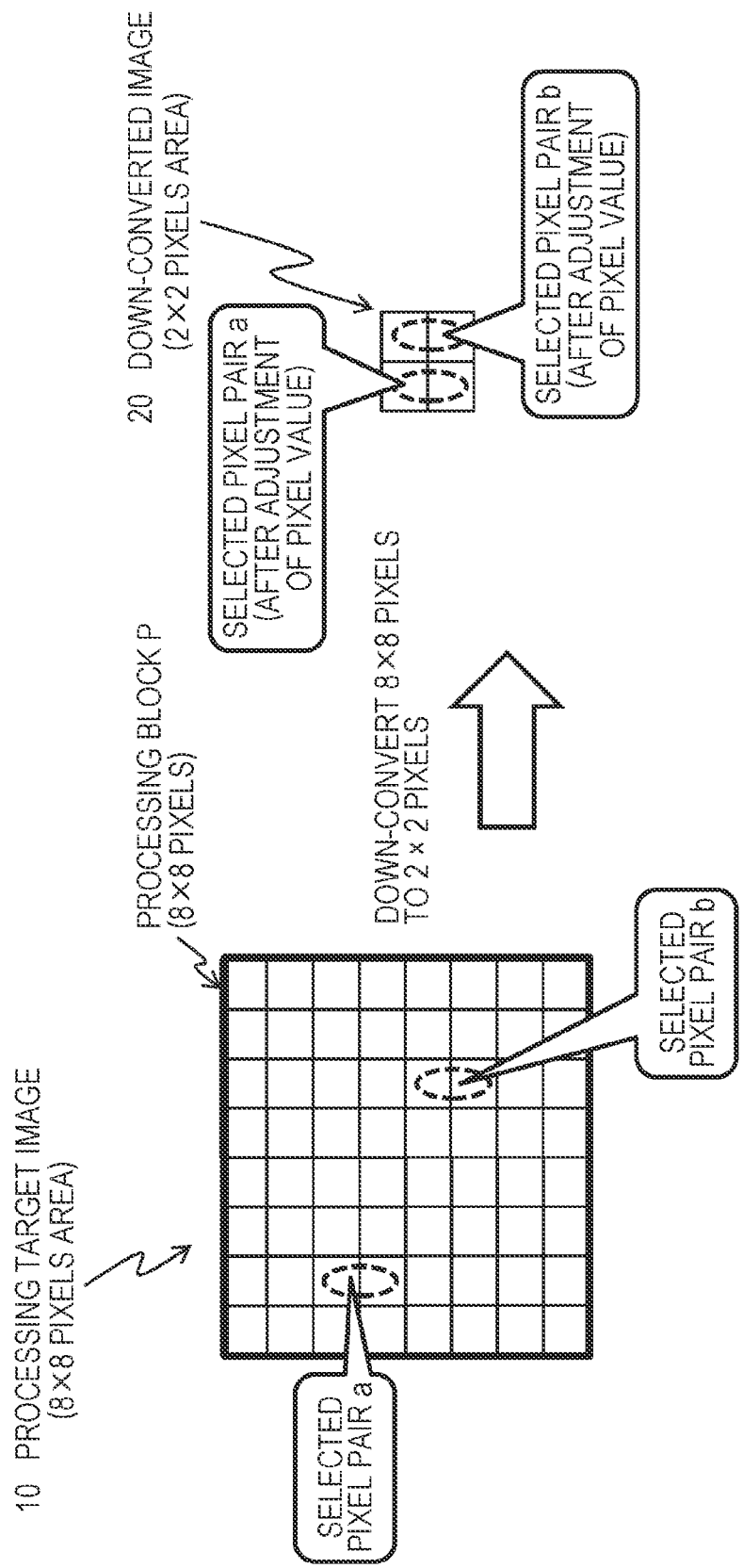
FIG. 12 is a diagram illustrating a specific example of pixel pair selection processing executed by the output image generation unit.

In the example shown in FIG. 12, 8×8=64 pixels of the processing target image 10 are regarded as one processing block. In the case of performing this down-conversion processing, two pixel pairs are selected as the output pixel pair from one processing block of the processing target image 10, that is, the processing block of 8×8 pixels, which are pixel pairs a and b shown in the figure.

The four pixels constituting these two pixel pairs a and b are arranged in the area of 2×2 pixels, which is a partial image area of the down-converted image 20.

However, the pixel values of the selected pixel pairs a and b are not set as they are but set to the constituent pixel values of the down-converted image 20 after executing the pixel value adjustment described later.

This processing allows the 8×8 pixel areas of the processing target image to be down-converted to the 2×2 pixels of the down-converted image 20.

Figure 13:
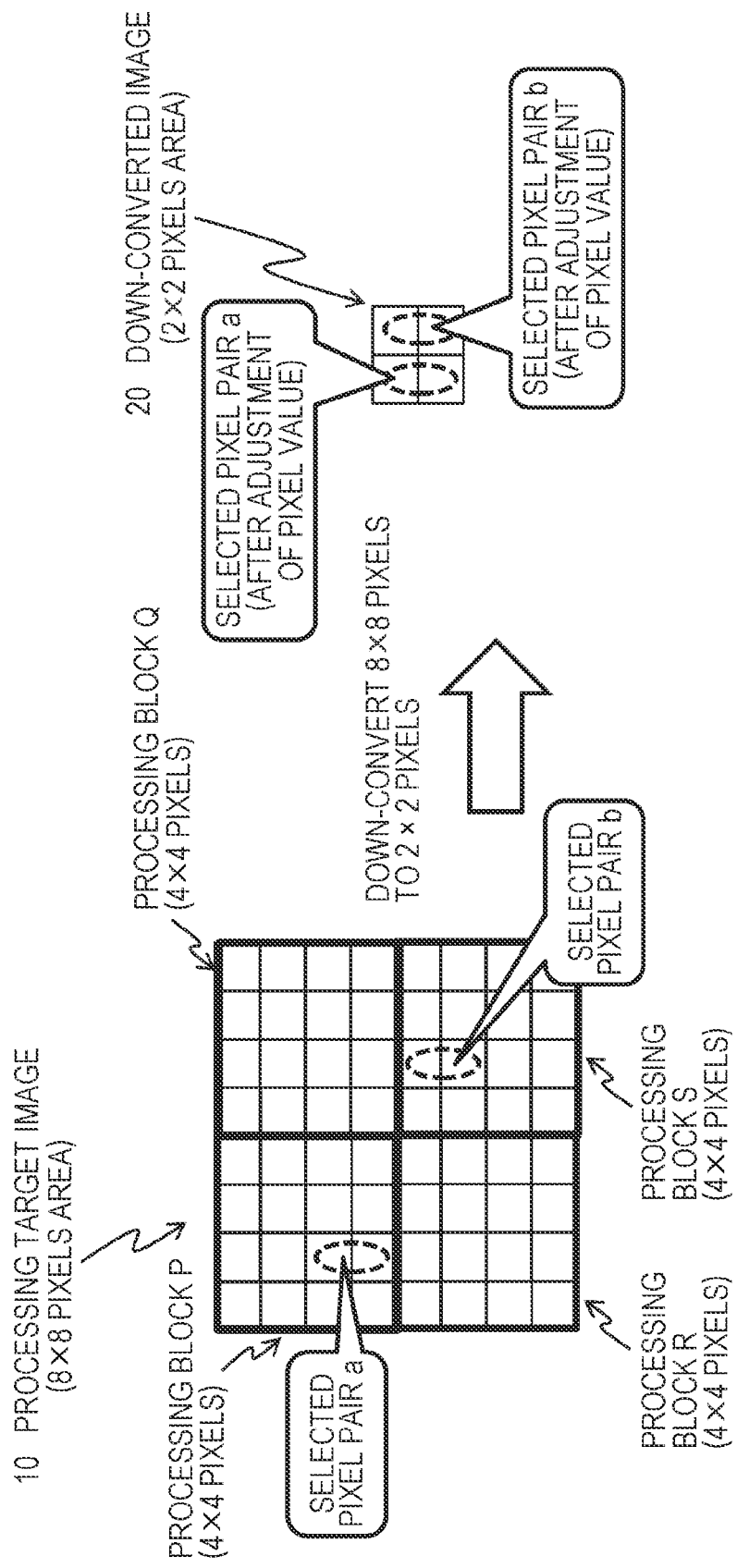
FIG. 13 is a diagram illustrating a specific example of pixel pair selection processing executed by the output image generation unit.

FIG. 13 illustrates an example of down-converting 8×8=64 pixels of the processing target image 10 to 2×2=4 pixels as in FIG. 12, but in the example shown in FIG. 13, 4×4=16 pixels of the processing target image 10 are regarded as one processing block. In other words, 8×8=64 pixels of the processing target image 10 include four processing blocks.

In the case of performing the down-conversion processing in such setting, two pixel pairs are selected as the output pixel pair from four processing blocks of the processing target image 10.

In this case, the output pixel selection unit 150 collects four sorting results for each processing block generated by the sort processing unit 125 of the image analysis unit 120, re-sorts them, and performs the pixel pair selection processing by using a result of the re-sort processing.

Thus, as shown in FIG. 13, in one example, one output pixel pair is selected from each of processing blocks P and S.

The four pixels constituting these two pixel pairs a and b are arranged in the area of 2×2 pixels, which is a partial image area of the down-converted image 20.

However, the pixel values of the selected pixel pairs a and b are not set as they are but set to the constituent pixel values of the down-converted image 20 after executing the pixel value adjustment described later.

This processing allows the 8×8 pixel areas of the processing target image to be down-converted to the 2×2 pixels of the down-converted image 20.

In this way, the number of pixel pairs selected in the pixel pair selection processing by the output pixel selection unit 150 will be the number corresponding to the down-conversion ratio of the down-conversion processing executed by the image processing apparatus 100.

The "output pixel pair data" obtained as the result of the pixel pair selection processing by the output pixel selection unit 150 is input to the pixel value adjustment unit 160 in the subsequent stage.

Moreover, the "output pixel pair data" includes pixel value difference information (difn) and pixel position information (Px, Py) of the selected pixel pair.

Moreover, the "output pixel pair data" selected by the output pixel selection unit 150 includes various numbers of pixel pairs, for example, various numbers of pixel pairs such as two pixel pairs or four pixel pairs. This number is determined by the down-conversion ratio and the size of the processing block as described above with reference to FIGS. 11 to 13.

The pixel value adjustment unit 160 adjusts the pixel value of the pixel pair selected by the output pixel value selection unit 150. Specifically, the modulation processing is executed corresponding to the difference value of the pixel value (luminance value in this embodiment) of the pixel pair selected by the output pixel value selection unit 150.

The details of the configuration of the pixel value adjustment unit 160 and the processing thereof are described with reference to FIG. 14.

Figure 14:
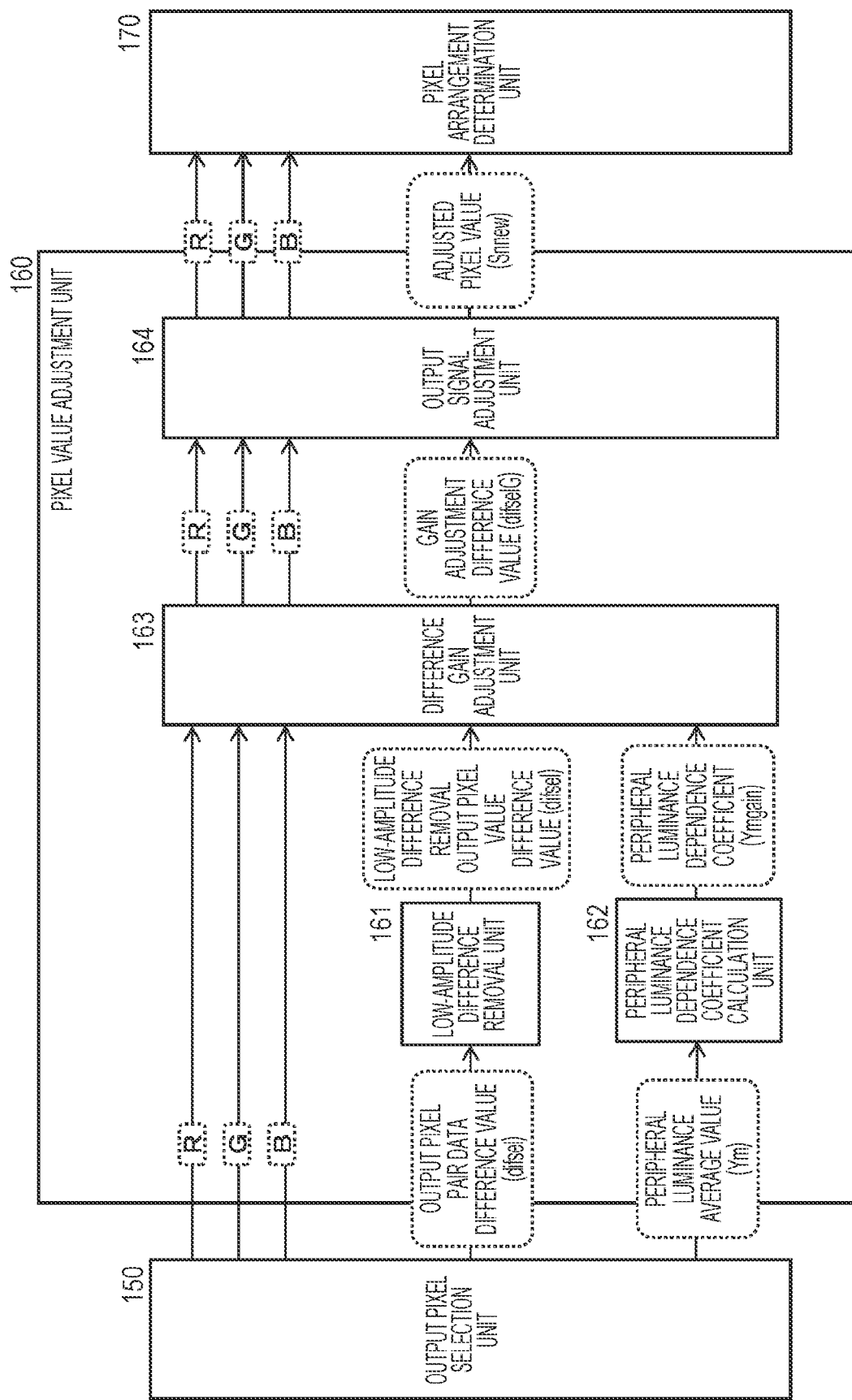
FIG. 14 is a diagram illustrating a configuration and processing of a pixel value adjustment unit.

As illustrated in FIG. 14, the pixel value adjustment unit 160 includes a low-amplitude difference removal unit 161, a peripheral luminance dependence coefficient calculation unit 162, a difference gain adjustment unit 163, and an output signal adjustment unit 164.

The difference value (difsel) of the pixel pair selected by the output pixel value selection unit 150 is input to the low-amplitude difference removal unit 161.

The low-amplitude difference removal unit 161 determines whether or not the difference value (difsel) of each pixel pair selected by the output pixel value selection unit 150 is equal to or less than a predetermined threshold value TH_N.

In other words, it is determined whether or not the difference value (difsel) of each pixel pair selected by the output pixel value selection unit 150 satisfies the determination formula below:

$$difsel \leq TH\_N$$

If the difference value (difsel) of the pixel pair satisfies the above determination formula, the difference value (difsel) of the pixel pair is updated to one of adjustment difference values (difsel) below:

(Adjustment example 1) Adjustment difference value (difsel)=0, (Adjustment example 2) Adjustment difference value (difsel)=difference value (difsel)−TH_N The difference of the pixel pair with a small difference is likely to be noise, so this processing is used for removing this noise component.

Moreover, the user is able to set whether to execute (Adjustment example 1) or (Adjustment example 2). This user setting information can be input via an input unit (e.g., user IF). The user is able to perform the processing of switching the setting, in one example, while observing the down-converted image displayed on a display unit.

As described above, if the difference value (difsel) of each pixel pair selected by the output pixel value selection unit 150 satisfies the determination formula below, $$difsel \leq TH\_N$$

the difference value (difsel) of the pixel pair in which the adjustment of (Adjustment example 1) or (Adjustment example 2) is made is input to the difference gain adjustment unit 163.

Moreover, if the difference value (difsel) of the pixel pair selected by the output pixel value selection unit 150 does not satisfy the determination formula below, $$difsel \leq TH\_N$$

the difference value (difsel) of the pixel pair is input to the difference gain adjustment unit 163 without modification.

In one example, there can be a case where two sets of pixel pairs are selected by the output pixel value selection unit 150. In this case, if one set of pixel pair having a larger difference does not satisfy the determination formula above and the other set of pixel pair having a smaller difference satisfies the determination formula above, a difference value (didsel1) of the set of pixel pair having a larger difference is input to the difference gain adjustment unit 163 without modification. A difference value (didsel2) of the other set of pixel pair having a smaller difference is adjusted by (Adjustment example 1) or (Adjustment example 2) described above and is input to the difference gain adjustment unit 163.

The "low-amplitude difference removal output pixel value difference value (difsel)" input from the low-amplitude difference removal unit 161 to the difference gain adjustment unit 163 shown in FIG. 14 includes these various pixel value difference values.

The processing executed by the peripheral luminance dependence coefficient calculation unit 162 is now described.

The peripheral luminance average value (Ym) calculated by the peripheral luminance average value calculation unit 124 of the image analysis unit 120 is input to the peripheral luminance dependence coefficient calculation unit 162 via the output pixel selection unit 150 of the output image generation unit 140.

The peripheral luminance average value (Ym) is the average value of the luminance values of the pixels that includes the peripheral pixels centered on the processing block, as described above with reference to FIG. 9. In one example, the "peripheral luminance average value (Ym)" corresponding to the processing block of 4×4 pixels illustrated in FIG. 9 is the average luminance of the pixel area of 12×12 pixels shown in FIG. 9.

The peripheral luminance dependence coefficient calculation unit 162 calculates a gain value (Ymgain), which is the peripheral luminance dependence coefficient, on the basis of the peripheral luminance average value (Ym).

Figure 15:
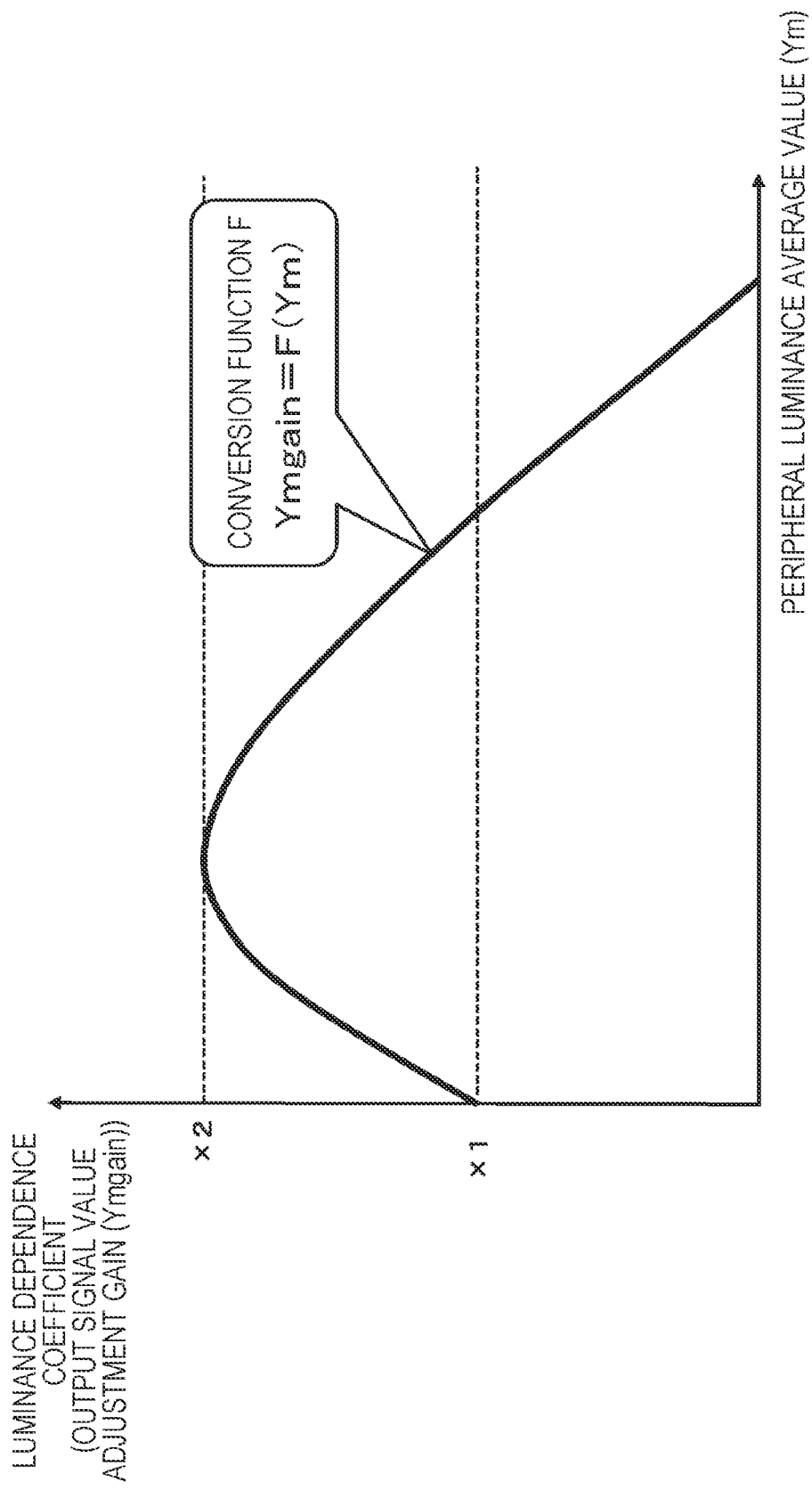
FIG. 15 is a diagram illustrating an example of calculation processing of a peripheral luminance dependence coefficient (output signal value adjustment gain Ymgain) based on a peripheral luminance average value (Ym).

The calculation processing of the peripheral luminance dependence coefficient (output signal value adjustment gain Ymgain) based on the peripheral luminance average value (Ym) is executed by using, for example, a specified conversion function (F) as shown in FIG. 15.

The conversion function F is a function used to calculate the peripheral luminance dependence coefficient (the output signal value adjustment gain Ymgain) on the basis of the peripheral luminance average value (Ym), as below:

$$Ymgain = F(Ym)$$

In the example shown in FIG. 15, the peripheral luminance dependence coefficient (the output signal value adjustment gain Ymgain) is set as a function that varies in the range of 0 to 2 depending on the value of the peripheral luminance average value (Ym).

Moreover, it is preferable to set the vicinity of the peripheral luminance average value (Ym) corresponding to the luminance level most easily viewable by the human eye to the region having the highest gain (gain=2).

Moreover, the user is able to adjust this conversion function optionally. The adjustment can be performed via an input unit (e.g., user IF). The user is able to perform the adjustment processing, in one example, while observing the down-converted image displayed on a display unit.

The peripheral luminance dependence coefficient (the output signal value adjustment gain Ymgain) calculated by the peripheral luminance dependence coefficient calculation unit 162 on the basis of the peripheral luminance average value (Ym) is input to the difference gain adjustment unit 163 in the subsequent stage.

The difference gain adjustment unit 163 receives as an input the data below:

(1) "Low-amplitude difference removal output pixel value difference value (difsel)" generated by the low-amplitude difference removal unit 161, and (2) Peripheral luminance dependence coefficient calculated by the peripheral luminance dependence coefficient calculation unit 162 (output signal value adjustment gain Ymgain).

Moreover, as described above, (1) "Low-amplitude difference removal output pixel value difference value (difsel)" generated by the low-amplitude difference removal unit 161 is the data corresponding to the pixel pair selected by the output pixel value selection unit 150, and includes pixel value difference values (difsel) corresponding to not only one but a plurality of pixel pairs.

The difference value of a part of it (the difference is less than or equal to the threshold value (TH_N)) is the difference value adjusted, in the low-amplitude difference removal unit 161, by any of the followings.

Figure 16A:
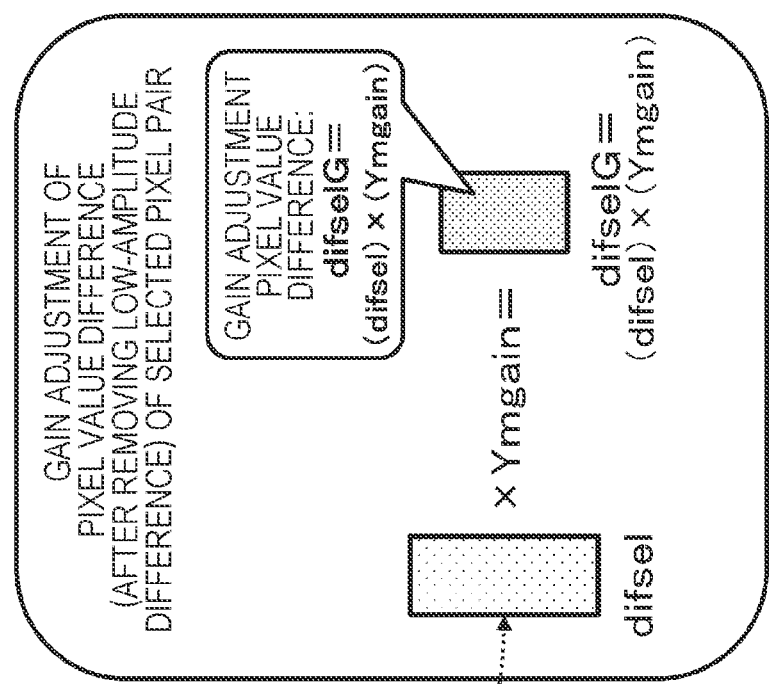
FIGS. 16A and 16B are diagrams illustrating processing executed by a difference gain adjustment unit.
Figure 16B:
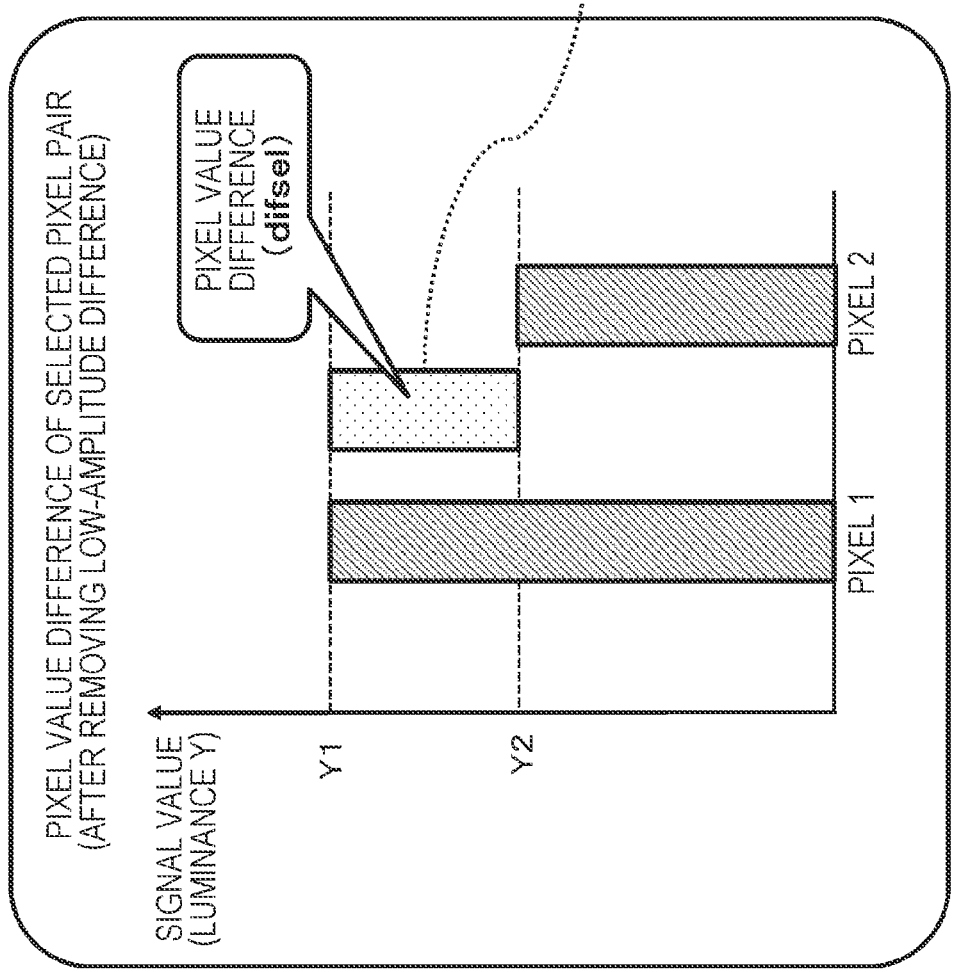

(Adjustment example 1) Adjustment difference value (difsel)=0, (Adjustment example 2) Adjustment difference value (difsel)=difference value (difsel)−TH_N The processing executed by the difference gain adjustment unit 163 is described with reference to FIGS. 16A and 16B. FIGS. 16A and 16B is a are diagrams illustrating data and processing as below:

FIG. 16A Pixel value difference of selected pixel pair (after removing low amplitude difference)

FIG. 16B Gain adjustment of pixel value difference (after removing low-amplitude difference) of selected pixel pair In FIGS. 16A and 16B, FIG. 16A shows a pixel value difference (difsel) corresponding to an output pixel pair (pixel 1 and pixel 2) selected by the output pixel value selection unit 150.

Moreover, this pixel value difference is the "low-amplitude difference removal output pixel value difference value (difsel)" generated by the low-amplitude difference removal unit 161.

The difference gain adjustment unit 163 performs processing of multiplying "low-amplitude difference removal output pixel value difference value (difsel)" generated by the low-amplitude difference removal unit 161 by the peripheral luminance dependence coefficient (the output signal value adjustment gain Ymgain) calculated by the peripheral luminance dependence coefficient calculation unit 162 to calculate a gain adjustment pixel value difference (difselG). In other words, as shown in FIG. 16B, the gain adjustment pixel value difference (difselG) is calculated in accordance with Formula (1) below:

$$difselG = difsel \times Ymgain \quad \text{Formula (1)}$$

The difference gain adjustment unit 163 adjusts the gain of the difference value (difsel) of each output pixel pair that is input from the low-amplitude difference removal unit 161.

The gain adjustment pixel value difference (difselG) corresponding to each output pixel pair calculated in accordance with Formula (1) above is input to the output signal adjustment unit 164.

Figure 17B:
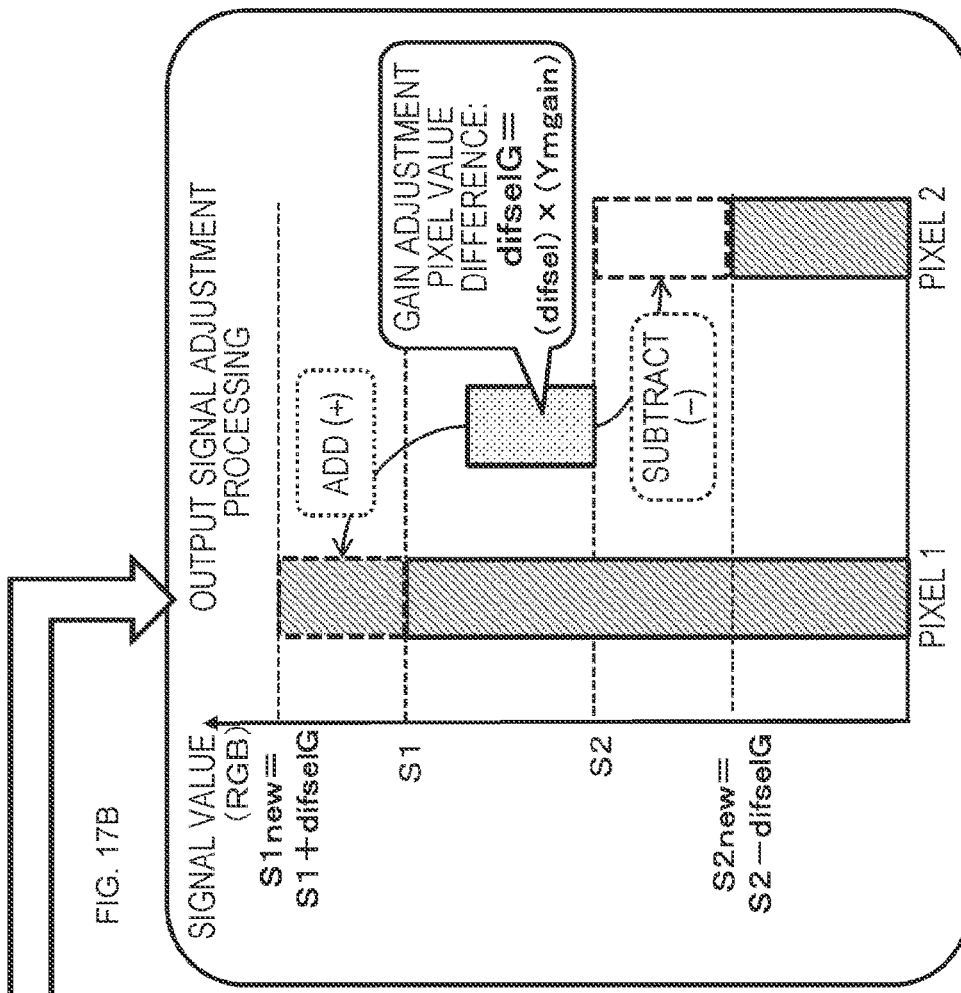
FIGS. 17A and 17B are diagrams illustrating processing executed by an output signal adjustment unit.
Figure 17A:
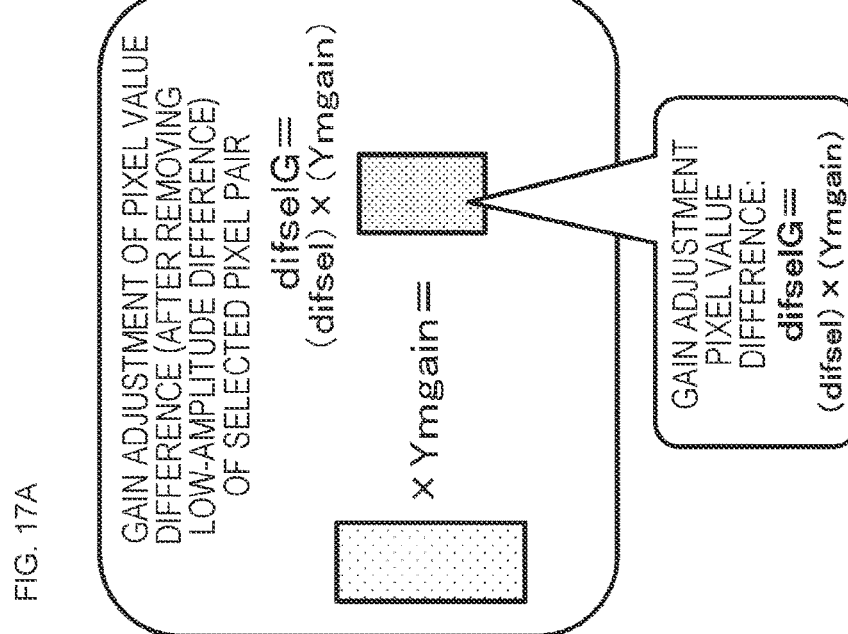

The processing to be executed by the output signal adjustment unit 164 is described with reference to FIGS. 17A and 17B. FIGS. 17A and 17B illustrate "FIG. 17B Output signal adjustment processing"

in addition to

"FIG. 17A Gain adjustment of pixel value difference (after removing low-amplitude difference) of the selected pixel pair", described above with reference to FIGS. 16A and 16B.

The output signal adjustment processing shown in the portion (c) of FIG. 17B corresponds to the processing to be executed by the output signal adjustment unit 164.

The output signal adjustment unit 164 performs processing of adding and subtracting the gain adjustment pixel value difference (difselG) calculated by the difference gain adjustment unit 163 for each of signals S1 and S2 of the output pixel pair (pixel 1 and pixel 2) selected by the output pixel value selection unit 150.

Moreover, the signals S1 and S2 are signal values of any of the original RGB of the selected output pixel pair.

For pixel 1 (pixel value S1) having a high pixel value (luminance value) of the output pixel pair (pixel 1 and pixel 2) selected by the output pixel value selection unit 150, the gain adjustment pixel value difference (difselG) calculated by the difference gain adjustment unit 163 is added to the original pixel value S1.

On the other hand, for pixel 2 (pixel value S2) having a low pixel value of the output pixel pair (pixel 1 and pixel 2), the gain adjustment pixel value difference (difselG) calculated by the difference gain adjustment unit 163 is subtracted from the original pixel value S2.

In other words, for pixel 1, a new pixel value (adjustment pixel value) "S1new"

is calculated as:

$$S1new = S1 + difselG$$

For pixel 2, a new pixel value (adjustment pixel value) "S2new"

is calculated as:

$$S2new = S2 - difselG$$

These adjusted pixel values are the output pixel values of the down-converted image.

In this way, the processing of adding and subtracting the gain adjustment pixel value difference (difselG) calculated by the difference gain adjustment unit 163 is performed for each of the signals S1 and S2 of the output pixel pair (pixel 1 and pixel 2) selected by the output pixel value selection unit 150. Thus, it is possible for the contrast or texture information of the output down-converted image 20 to be an image having contrast or texture information similar to the original processing target image 10.

The output signal adjustment unit 164 executes the processing described with reference to FIGS. 17A and 17B for each signal of the output pixel pair (pixel 1 and pixel 2) selected by the output pixel value selection unit 150 to calculate each new pixel value (adjusted pixel value=S1new, S2new) of the output pixel pair (pixel 1 and pixel 2).

These calculated pixel values (Snnew) are input to the pixel arrangement determination unit 170.

The pixel arrangement determination unit 170 determines, as the calculated pixel value (Snnew) corresponding to each output pixel pair selected by the output pixel value selection unit 150, the arrangement upon setting the pixel value calculated by the output signal adjustment unit 164 as the pixel value of the down-converted image 20.

The pixel arrangement determination unit 170 determines the arrangement in such a way that a positional relationship of the pixel pair selected as the output pixel pair from the original processing target image 10 is maintained in the down-converted image 20 to be output.

A specific example thereof is described with reference to FIG. 18.

Figure 18:
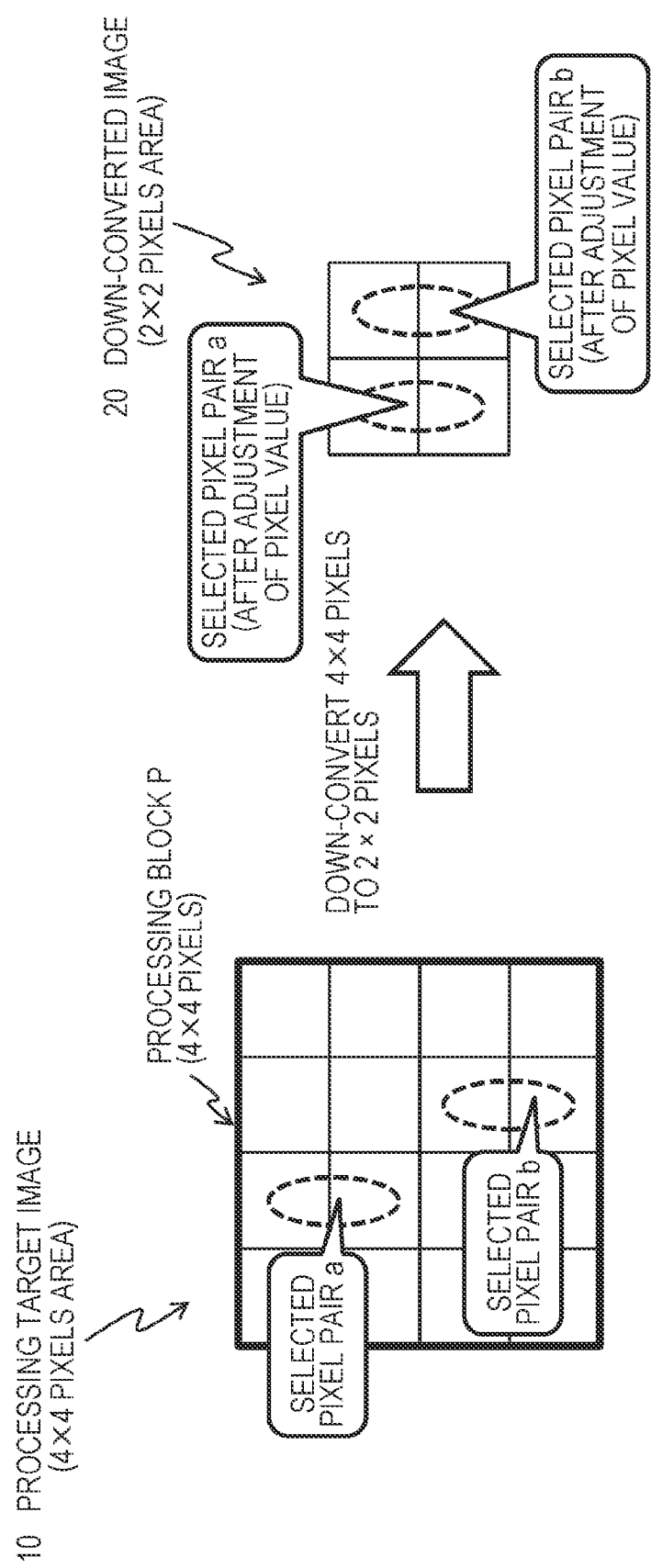
FIG. 18 is a diagram illustrating an example of a pixel arrangement determination processing executed by a pixel arrangement determination unit.

The left side of FIG. 18 is, one processing block of the processing target image 10, that is, a processing block of 4×4 pixels. The right side is a block of 2×2 pixels, which is a partial image area of the down-converted image 20 after down-conversion by the image processing apparatus 100.

The example shown in FIG. 18 is an example of down-converting one processing block, that is, 4×4=16 pixels, of the processing target image 10, to 2×2=4 pixels.

In performing such down-conversion processing, the pixel arrangement determination unit 170 determines the arrangement in such a way that the positional relationship of the pixel pair selected as the output pixel pair from the original processing target image 10 is maintained in each down-converted image 20.

Specifically, they are arranged in the down-converted image 20 by incorporating the vertical or horizontal arrangement relationship of a plurality of pixel pairs selected from one processing block of the processing target image 10 as much as possible. It is preferable that the arrangement does not reverse at least the vertical and horizontal arrangement relationships.

Such arrangement processing makes it possible to incorporate the contrast or texture positional relationship of the original processing target image 10 in the down-converted image 20 having the positional relationship with no modification.

The description above is given of the configuration example and processing of the image processing apparatus of the present disclosure, and the processing described above can obtain the effect as follows:

(a) Improved visibility of texture even on display devices with low resolution, (b) High-precision adjustable regardless of whether user focus adjustment based on contrast or autofocusing, (c) Value trainable in output width in dynamic range depending on display devices, e.g., allowing for outputting an image with reduced overexposure even on display devices with low dynamic range, and (d) Setting change of selected pixel pair for each processing block that enables down-conversion to any resolution.

The effects above are examples.

4. Exemplary Configuration of Image Processing Apparatus of the Present Disclosure Applied to Imaging Apparatus An exemplary configuration in a case where the image processing apparatus 100 of the present disclosure described above is applied to an imaging apparatus is now described.

Figure 19:
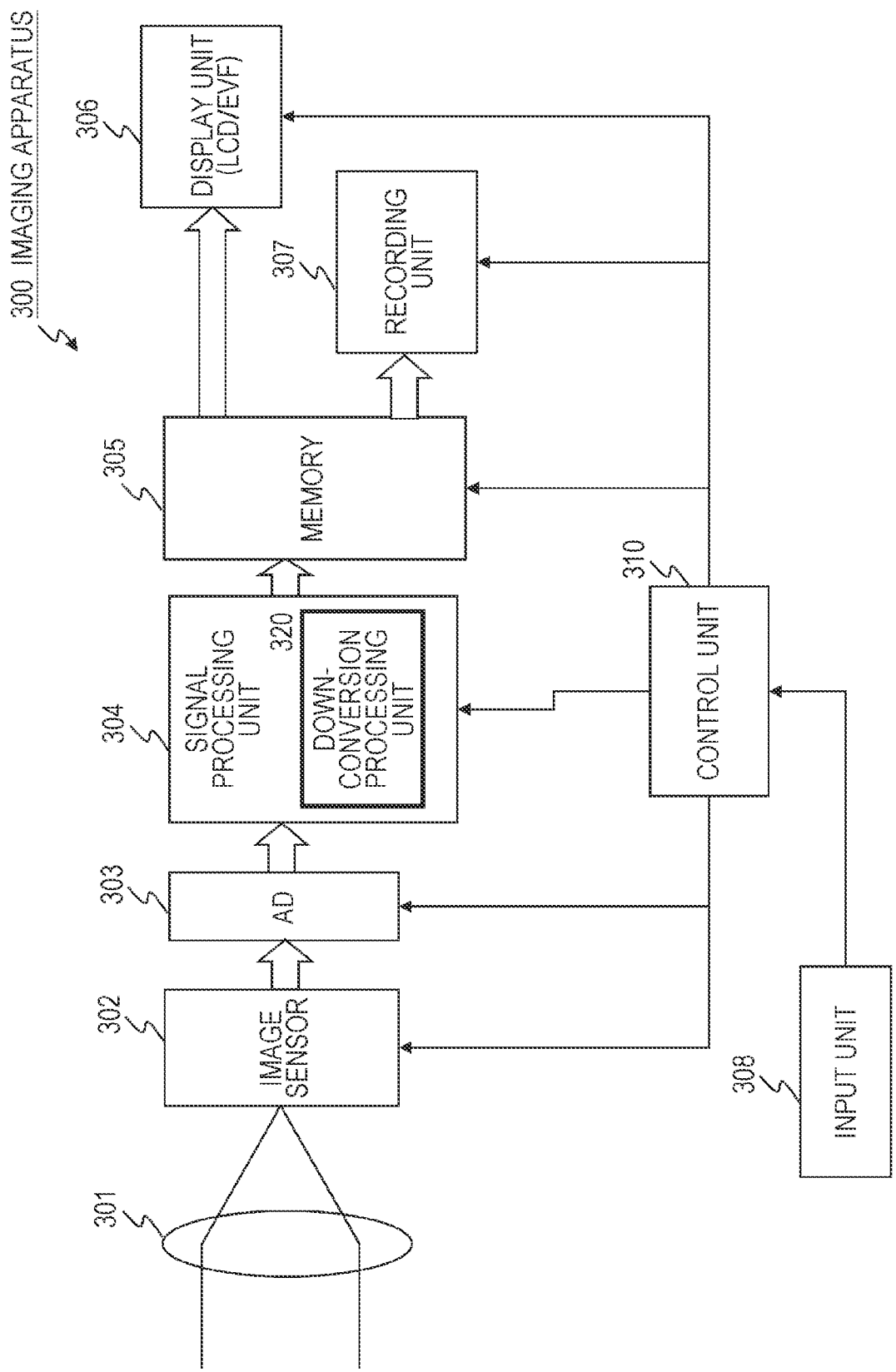
FIG. 19 is a diagram illustrating an exemplary configuration of an imaging apparatus.

FIG. 19 is a block diagram illustrating an exemplary configuration in a case where the image processing apparatus 100 of the present disclosure is applied to the imaging apparatus 300.

The imaging apparatus 300 illustrated in FIG. 19 includes an optical lens 301, an image sensor 302, an A/D converter 303, a signal processing unit 304, a memory 305, a display unit (LCD/EVF) 306, a recording unit 307, an input unit 308, and a control unit 310.

The signal processing unit 304 includes a down-conversion processing unit 320 that executes the processing similar to the processing in the image processing apparatus 100 described above.

The input unit 308 is an operation unit used for allowing various user inputs such as a release button (shutter button), a shooting mode, a shooting mode setting, a display image setting of the display unit 306, and a down-conversion processing setting in the down-conversion processing unit 320.

Moreover, it is also possible to use the display unit 306 as a user operation unit in the form of a touch panel.

The control unit 310 inputs a control signal or synchronization signal to the components from the image sensor 302 to the recording unit 307 and executes various processing controls such as control of processing execution timing of each component.

Specifically, the control unit 310 includes a CPU or the like that executes processing in accordance with a program stored in a storage unit (not shown).

The light incident through the optical lens 301 enters an image capturing unit, for example, an image sensor 302 such as a CMOS image sensor, is subjected to the photoelectric conversion, and is output as image data. Moreover, the output image of the image sensor 302 is input to the A/D converter 303.

The A/D converter 303 executes A/D conversion for the input signal, that is, the processing of converting an analog signal into a digital signal, and inputs the converted digital value to the signal processing unit 304.

The signal processing unit 304 executes signal processing in a typical camera, such as white balance (WB) adjustment or gamma correction, and generates a recording image to be stored in the recording unit 307. Furthermore, the down-conversion processing unit 320 generates a display image to be displayed on the display unit 306. Alternatively, an image to be recorded in the storage unit 307 is generated.

This down-conversion processing is the processing similar to the down-conversion processing executed by the image processing apparatus 100 described above, and the processing according to the embodiment described above is executed.

Moreover, in the case where the image stored in the recording unit 307 is not a down-converted image, the down-conversion processing unit 320 can perform down-conversion for the image upon displaying it on the display unit 306.

The display unit 306 includes, in one example, an LCD, an EVF, or the like, and is checkable by the user who captures an image.

Moreover, the down-converted image generated by the down-conversion processing unit 320 is also used for the focus adjustment based on contrast executed by the user or the control unit 310.

The use of the processing of the present disclosure makes it possible to generate a down-converted image having contrast with no deterioration and to perform the focus adjustment based on the contrast using the down-converted image with high accuracy.

5. Hardware Configuration Example of Image Processing Apparatus of the Present Disclosure A hardware configuration example of an image processing apparatus 100 explained in the embodiments described above is now described with reference to FIG. 20.

Figure 20:
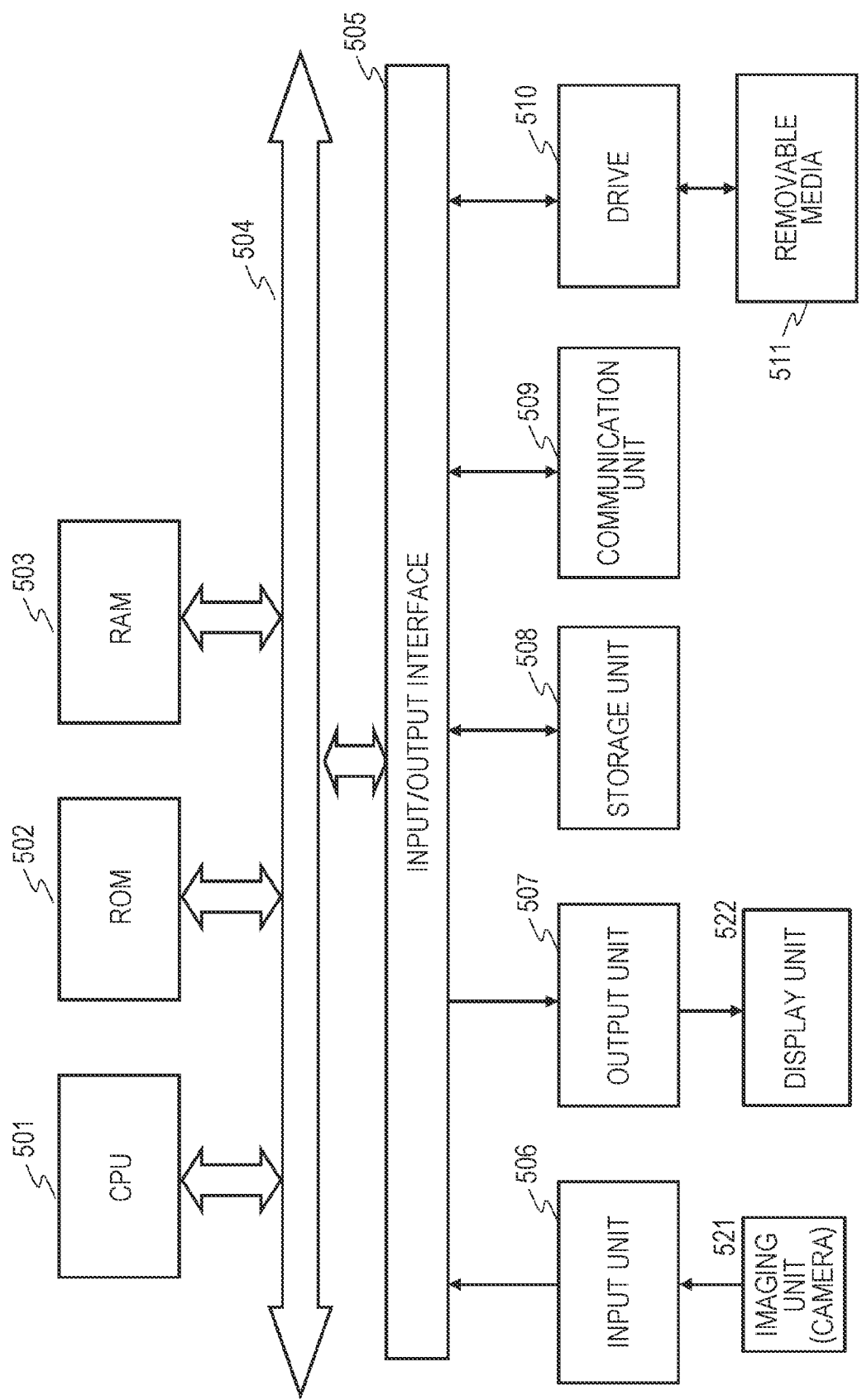
FIG. 20 is a diagram illustrating a hardware configuration example of an image processing apparatus.

FIG. 20 is a diagram showing a hardware configuration example of the image processing apparatus that executes processing of the present disclosure.

A central processing unit (CPU) 501 functions as a control unit or a data processing unit that executes various processes according to a program stored in a read only memory (ROM) 502 or a storage unit 508. For example, the processing according to the sequence described in the above-described embodiments is performed. The program to be executed by the CPU 501, data, and the like are stored in a random access memory (RAM) 503. The CPU 501, the ROM 502, and the RAM 503 are mutually connected via a bus 504.

The CPU 501 is connected to an input/output interface 505 via the bus 504, and the input/output interface 505 is connected to an input unit 506 including various switches, a keyboard, a mouse, a microphone, and the like, by which the user can input as well as entering a captured image of the imaging unit 521, and an output unit 507 that executes data output to a display unit 522, speakers, and the like. The CPU 501 executes various processes in response to an instruction input from the input unit 506, and outputs processing results to, for example, the output unit 507.

The storage unit 508 connected to the input/output interface 505 is configured using, for example, a hard disk and the like, and stores a program to be executed by the CPU 501 and various types of data. A communication unit 509 functions as a transmission/reception unit of Wi-Fi communication, Bluetooth (registered trademark) (BT) communication, and other data communication via a network such as the Internet and a local area network, and communicates with an external apparatus.

A drive 510 connected to the input/output interface 505 drives removable media 511 such as a magnetic disk, an optical disk, a magneto-optical disk, and a semiconductor memory such as a memory card, and executes data recording or reading.

6. Application Examples

The technology according to the present disclosure can be applied to various products. In one example, the technology according to the present disclosure is applicable to an endoscopic surgery system.

Figure 21:
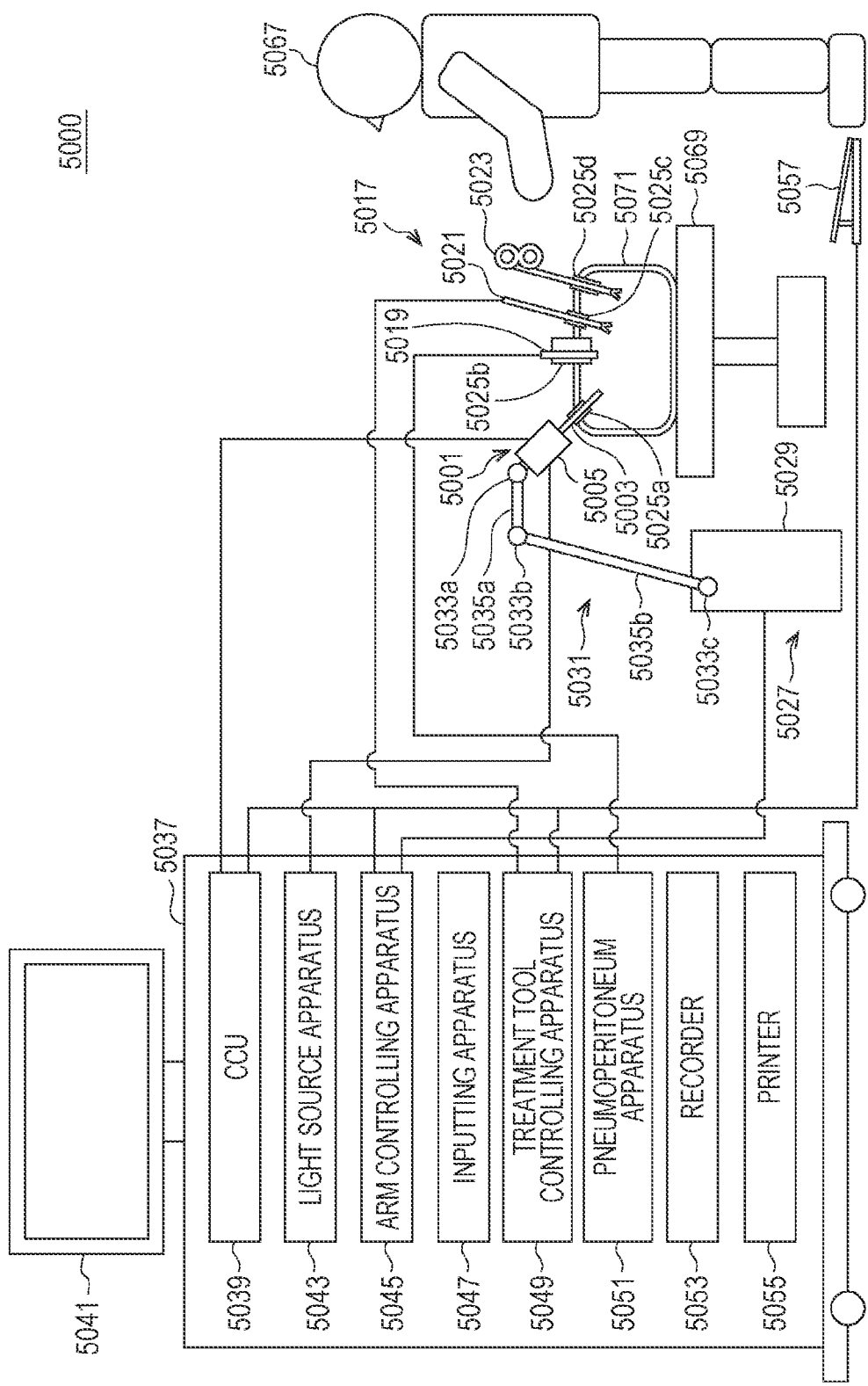
FIG. 21 is a view showing an example of a schematic configuration of an endoscopic surgery system.

FIG. 21 is a view showing an example of a schematic configuration of an endoscopic surgery system 5000 to which the technology according to the present disclosure can be applied. In FIG. 21, a state is illustrated in which a surgeon (medical doctor) 5067 is using the endoscopic surgery system 5000 to perform surgery for a patient 5071 on a patient bed 5069. As illustrated, the endoscopic surgery system 5000 includes an endoscope 5001, other surgical tools 5017, a supporting arm apparatus 5027 which supports the endoscope 5001 thereon, and a cart 5037 on which various apparatus for endoscopic surgery are mounted.

In endoscopic surgery, in place of incision of the abdominal wall to perform laparotomy, a plurality of tubular aperture devices called trocars 5025a to 5025d is used to puncture the abdominal wall. Then, a lens barrel 5003 of the endoscope 5001 and the other surgical tools 5017 are inserted into body cavity of the patient 5071 through the trocars 5025a to 5025d. In the example illustrated, as the other surgical tools 5017, a pneumoperitoneum tube 5019, an energy device 5021 and forceps 5023 are inserted into body cavity of the patient 5071. Further, the energy device 5021 is a treatment tool for performing incision and peeling of a tissue, sealing of a blood vessel or the like by high frequency current or ultrasonic vibration. However, the surgical tools 5017 illustrated are mere examples at all, and as the surgical tools 5017, various surgical tools which are generally used in endoscopic surgery such as, for example, tweezers or a retractor may be used.

An image of a surgical region in a body cavity of the patient 5071 imaged by the endoscope 5001 is displayed on a display apparatus 5041. The surgeon 5067 would use the energy device 5021 or the forceps 5023 while watching the image of the surgical region displayed on the display apparatus 5041 on the real time basis to perform such treatment as, for example, resection of an affected area. It is to be noted that, though not illustrated, the pneumoperitoneum tube 5019, the energy device 5021, and the forceps 5023 are supported by the surgeon 5067, an assistant or the like during surgery.

(Supporting Arm Apparatus)

The supporting arm apparatus 5027 includes an arm unit 5031 extending from a base unit 5029. In the example illustrated, the arm unit 5031 includes joint portions 5033a, 5033b and 5033c and links 5035a and 5035b and is driven under the control of an arm controlling apparatus 5045. The endoscope 5001 is supported by the arm unit 5031 such that the position and the posture of the endoscope 5001 are controlled. Consequently, stable fixation in position of the endoscope 5001 can be implemented.

(Endoscope)

The endoscope 5001 includes the lens barrel 5003 which has a region of a predetermined length from a distal end thereof to be inserted into a body cavity of the patient 5071, and a camera head 5005 connected to a proximal end of the lens barrel 5003. In the example illustrated, the endoscope 5001 is illustrated as a rigid endoscope having the lens barrel 5003 of the hard type. However, the endoscope 5001 may otherwise be configured as a flexible endoscope having the lens barrel 5003 of the flexible type.

The lens barrel 5003 has, at a distal end thereof, an opening in which an objective lens is fitted. A light source apparatus 5043 is connected to the endoscope 5001 such that light generated by the light source apparatus 5043 is introduced to a distal end of the lens barrel by a light guide extending in the inside of the lens barrel 5003 and is irradiated toward an observation target in a body cavity of the patient 5071 through the objective lens. It is to be noted that the endoscope 5001 may be a forward-viewing endoscope or may be an oblique-viewing endoscope or a side-viewing endoscope.

An optical system and an image sensor are provided in the inside of the camera head 5005 such that reflected light (observation light) from an observation target is condensed on the image sensor by the optical system. The observation light is photo-electrically converted by the image sensor to generate an electric signal corresponding to the observation light, namely, an image signal corresponding to an observation image. The image signal is transmitted as RAW data to a camera control unit (CCU) 5039. It is to be noted that the camera head 5005 has a function incorporated therein for suitably driving the optical system of the camera head 5005 to adjust the magnification and the focal distance.

It is to be noted that, in order to establish compatibility with, for example, a stereoscopic vision (three dimensional (3D) display), a plurality of image sensors may be provided on the camera head 5005. In this case, a plurality of relay optical systems is provided in the inside of the lens barrel 5003 in order to guide observation light to each of the plurality of image sensors.

(Various Apparatus Incorporated in Cart)

The CCU 5039 includes a central processing unit (CPU), a graphics processing unit (GPU) or the like and integrally controls operation of the endoscope 5001 and the display apparatus 5041. In particular, the CCU 5039 performs, for an image signal received from the camera head 5005, various image processes for displaying an image based on the image signal such as a development process (demosaic process), The CCU 5039 provides the image signal for which the image processes have been performed to the display apparatus 5041. Further, the CCU 5039 transmits a control signal to the camera head 5005 to control driving of the camera head 5005. The control signal may include information relating to an image pickup condition such as a magnification or a focal distance.

The display apparatus 5041 displays an image based on an image signal for which the image processes have been performed by the CCU 5039 under the control of the CCU 5039. If the endoscope 5001 is ready for imaging of a high resolution such as 4K (horizontal pixel number 3840× vertical pixel number 2160), 8K (horizontal pixel number 7680×vertical pixel number 4320) or the like and/or ready for 3D display, then a display apparatus by which corresponding display of the high resolution and/or 3D display are possible may be used as the display apparatus 5041. Where the apparatus is ready for imaging of a high resolution such as 4K or 8K, if the display apparatus used as the display apparatus 5041 has a size of equal to or not less than 55 inches, then a more immersive experience can be obtained. Further, a plurality of display apparatus 5041 having different resolutions and/or different sizes may be provided in accordance with purposes.

The light source apparatus 5043 includes a light source such as, for example, a light emitting diode (LED) and supplies irradiation light for imaging of a surgical region to the endoscope 5001.

The arm controlling apparatus 5045 includes a processor such as, for example, a CPU and operates in accordance with a predetermined program to control driving of the arm unit 5031 of the supporting arm apparatus 5027 in accordance with a predetermined controlling method.

An inputting apparatus 5047 is an input interface for the endoscopic surgery system 5000. A user can perform inputting of various kinds of information or instruction inputting to the endoscopic surgery system 5000 through the inputting apparatus 5047. For example, the user would input various kinds of information relating to surgery such as physical information of a patient, information regarding a surgical procedure of the surgery and so forth through the inputting apparatus 5047. Further, the user would input, for example, an instruction to drive the arm unit 5031, an instruction to change an image pickup condition (type of irradiation light, magnification, focal distance or the like) by the endoscope 5001, an instruction to drive the energy device 5021 or the like through the inputting apparatus 5047.

The type of the inputting apparatus 5047 is not limited and may be that of any one of various known inputting apparatus. As the inputting apparatus 5047, for example, a mouse, a keyboard, a touch panel, a switch, a foot switch 5057 and/or a lever or the like may be applied. Where a touch panel is used as the inputting apparatus 5047, it may be provided on the display face of the display apparatus 5041.

Otherwise, the inputting apparatus 5047 is a device to be mounted on a user such as, for example, a glasses type wearable device or a head mounted display (HMD), and various kinds of inputting are performed in response to a gesture or a line of sight of the user detected by any of the devices mentioned. Further, the inputting apparatus 5047 includes a camera which can detect a motion of a user, and various kinds of inputting are performed in response to a gesture or a line of sight of a user detected from a video imaged by the camera. Further, the inputting apparatus 5047 includes a microphone which can collect the voice of a user, and various kinds of inputting are performed by voice collected by the microphone. By configuring the inputting apparatus 5047 such that various kinds of information can be inputted in a contactless fashion in this manner, especially a user who belongs to a clean area (for example, the surgeon 5067) can operate an apparatus belonging to an unclean area in a contactless fashion. Further, since the user can operate an apparatus without releasing a possessed surgical tool from its hand, the convenience to the user is improved.

A treatment tool controlling apparatus 5049 controls driving of the energy device 5021 for cautery or incision of a tissue, sealing of a blood vessel or the like. A pneumoperitoneum apparatus 5051 feeds gas into a body cavity of the patient 5071 through the pneumoperitoneum tube 5019 to inflate the body cavity in order to secure the field of view of the endoscope 5001 and secure the working space for the surgeon. A recorder 5053 is an apparatus capable of recording various kinds of information relating to surgery. A printer 5055 is an apparatus capable of printing various kinds of information relating to surgery in various forms such as a text, an image or a graph.

In the following, especially a characteristic configuration of the endoscopic surgery system 5000 is described in more detail.

(Supporting Arm Apparatus)

The supporting arm apparatus 5027 includes the base unit 5029 serving as a base, and the arm unit 5031 extending from the base unit 5029. In the example illustrated, the arm unit 5031 includes the plurality of joint portions 5033*a*, 5033*b* and 5033*c* and the plurality of links 5035*a* and 5035*b* connected to each other by the joint portion 5033*b*. In FIG. 21, for simplified illustration, the configuration of the arm unit 5031 is illustrated in a simplified form. Actually, the shape, number and arrangement of the joint portions 5033*a* to 5033*c* and the links 5035*a* and 5035*b* and the direction and so forth of axes of rotation of the joint portions 5033*a* to 5033*c* can be set suitably such that the arm unit 5031 has a desired degree of freedom. For example, the arm unit 5031 may preferably be configured such that it has a degree of freedom equal to or not less than 6 degrees of freedom. This makes it possible to move the endoscope 5001 freely within the movable range of the arm unit 5031. Consequently, it becomes possible to insert the lens barrel 5003 of the endoscope 5001 from a desired direction into a body cavity of the patient 5071.

An actuator is provided in each of the joint portions 5033*a* to 5033*c*, and the joint portions 5033*a* to 5033*c* are configured such that they are rotatable around predetermined axes of rotation thereof by driving of the respective actuators. The driving of the actuators is controlled by the arm controlling apparatus 5045 to control the rotational angle of each of the joint portions 5033*a* to 5033*c* thereby to control driving of the arm unit 5031. Consequently, control of the position and the posture of the endoscope 5001 can be implemented. Thereupon, the arm controlling apparatus 5045 can control driving of the arm unit 5031 by various known controlling methods such as force control or position control.

For example, if the surgeon 5067 suitably performs operation inputting through the inputting apparatus 5047 (including the foot switch 5057), then driving of the arm unit 5031 may be controlled suitably by the arm controlling apparatus 5045 in response to the operation input to control the position and the posture of the endoscope 5001. After the endoscope 5001 at the distal end of the arm unit 5031 is moved from an arbitrary position to a different arbitrary position by the control just described, the endoscope 5001 can be supported fixedly at the position after the movement. It is to be noted that the arm unit 5031 may be operated in a master-slave fashion. In this case, the arm unit 5031 may be remotely controlled by the user through the inputting apparatus 5047 which is placed at a place remote from the operating room.

Further, where force control is applied, the arm controlling apparatus 5045 may perform power-assisted control to drive the actuators of the joint portions 5033a to 5033c such that the arm unit 5031 may receive external force by the user and move smoothly following the external force. This makes it possible to move, when the user directly touches with the arm unit 5031 and moves the arm unit 5031, the arm unit 5031 with comparatively weak force. Accordingly, it becomes possible for the user to move the endoscope 5001 more intuitively by a simpler and easier operation, and the convenience to the user can be improved.

Here, generally in endoscopic surgery, the endoscope 5001 is supported by a medical doctor called scopist. In contrast, where the supporting arm apparatus 5027 is used, the position of the endoscope 5001 can be fixed more certainly without hands, and therefore, an image of a surgical region can be obtained stably and surgery can be performed smoothly.

It is to be noted that the arm controlling apparatus 5045 may not necessarily be provided on the cart 5037. Further, the arm controlling apparatus 5045 may not necessarily be a single apparatus. For example, the arm controlling apparatus 5045 may be provided in each of the joint portions 5033a to 5033c of the arm unit 5031 of the supporting arm apparatus 5027 such that the plurality of arm controlling apparatus 5045 cooperates with each other to implement driving control of the arm unit 5031.

(Light Source Apparatus)

The light source apparatus 5043 supplies irradiation light upon imaging of a surgical region to the endoscope 5001. The light source apparatus 5043 includes a white light source which includes, for example, an LED, a laser light source or a combination of them. In this case, where a white light source includes a combination of red, green, and blue (RGB) laser light sources, since the output intensity and the output timing can be controlled with a high degree of accuracy for each color (each wavelength), adjustment of the white balance of a picked up image can be performed by the light source apparatus 5043. Further, in this case, if laser beams from the respective RGB laser light sources are irradiated time-divisionally on an observation target and driving of the image sensors of the camera head 5005 is controlled in synchronism with the irradiation timings, then images individually corresponding to the R, G and B colors can be picked up time-divisionally. According to the method just described, a color image can be obtained even if a color filter is not provided for the image sensor.

Further, driving of the light source apparatus 5043 may be controlled such that the intensity of light to be outputted is changed for each predetermined time. By controlling driving of the image sensor of the camera head 5005 in synchronism with the timing of the change of the intensity of light to acquire images time-divisionally and synthesizing the images, an image of a high dynamic range free from underexposed blocked up shadows and overexposed highlights can be created.

Further, the light source apparatus 5043 may be configured to supply light of a predetermined wavelength band ready for special light observation. In special light observation, for example, by utilizing the wavelength dependency of absorption of light in a body tissue to irradiate light of a narrower wavelength band in comparison with irradiation light upon ordinary observation (namely, white light), narrow band light observation (narrow band imaging) of imaging a predetermined tissue such as a blood vessel of a superficial portion of the mucous membrane or the like in a high contrast is performed. Alternatively, in special light observation, fluorescent observation for obtaining an image from fluorescent light generated by irradiation of excitation light may be performed. In fluorescent observation, it is possible to perform observation of fluorescent light from a body tissue by irradiating excitation light on the body tissue (autofluorescence observation) or to obtain a fluorescent light image by locally injecting a reagent such as indocyanine green (ICG) into a body tissue and irradiating excitation light corresponding to a fluorescent light wavelength of the reagent upon the body tissue. The light source apparatus 5043 can be configured to supply such narrow-band light and/or excitation light suitable for special light observation as described above.

(Camera Head and CCU)

Figure 22:
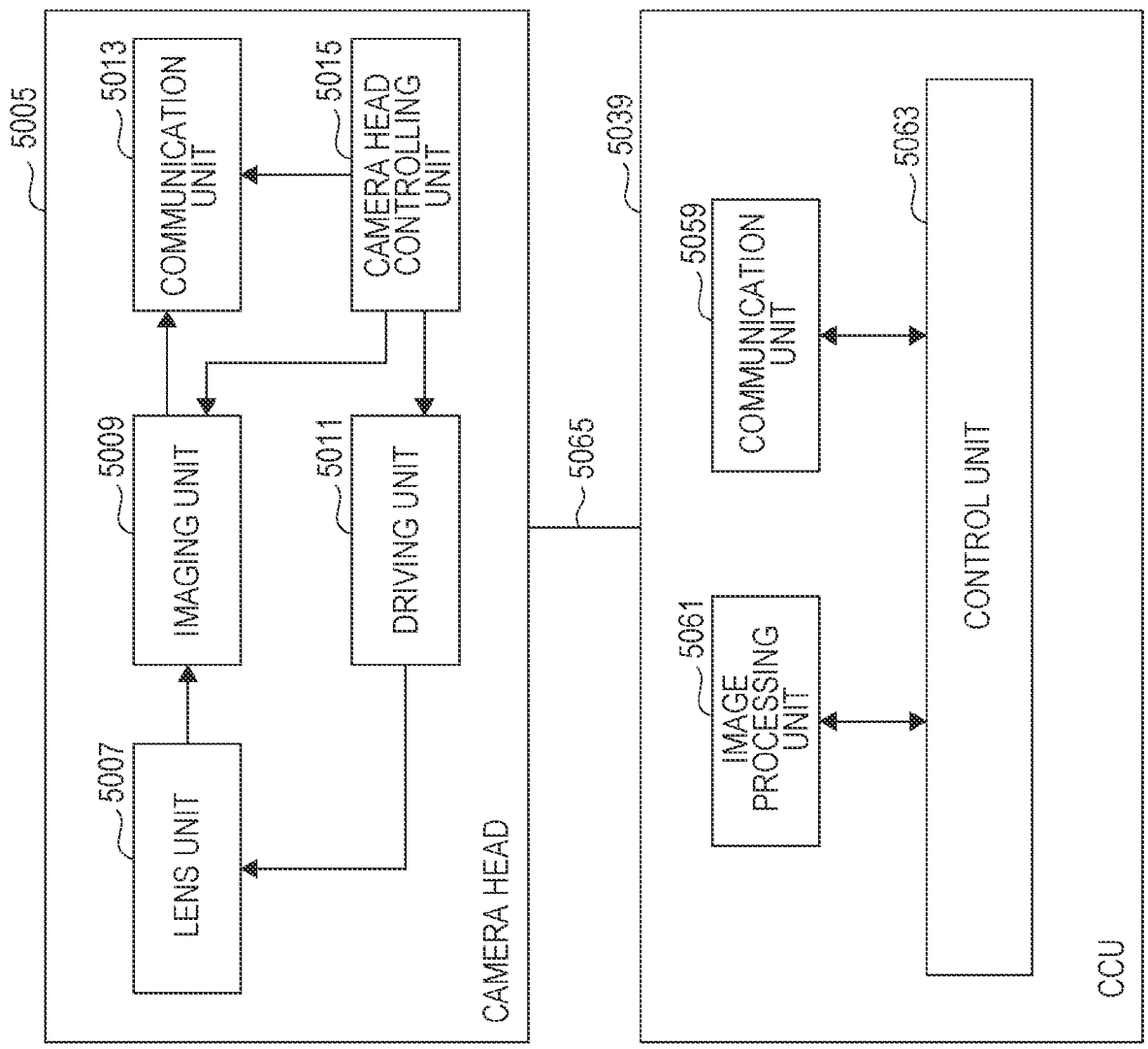
FIG. 22 is a block diagram showing an example of a functional configuration of a camera head and a camera control unit (CCU) illustrated in FIG. 21.

Functions of the camera head 5005 of the endoscope 5001 and the CCU 5039 are described in more detail with reference to FIG. 22. FIG. 22 is a block diagram showing an example of a functional configuration of the camera head 5005 and the CCU 5039 illustrated in FIG. 21.

Referring to FIG. 22, the camera head 5005 has, as functions thereof, a lens unit 5007, an imaging unit 5009, a driving unit 5011, a communication unit 5013 and a camera head controlling unit 5015. Further, the CCU 5039 has, as functions thereof, a communication unit 5059, an image processing unit 5061, and a control unit 5063. The camera head 5005 and the CCU 5039 are connected to be bidirectionally communicable to each other by a transmission cable 5065.

First, a functional configuration of the camera head 5005 is described. The lens unit 5007 is an optical system provided at a connecting location of the camera head 5005 to the lens barrel 5003. Observation light taken in from a distal end of the lens barrel 5003 is introduced into the camera head 5005 and enters the lens unit 5007. The lens unit 5007 includes a combination of a plurality of lenses including a zoom lens and a focusing lens. The lens unit 5007 has optical properties adjusted such that the observation light is condensed on a light receiving face of the image sensor of the imaging unit 5009. Further, the zoom lens and the focusing lens are configured such that the positions thereof on their optical axis are movable for adjustment of the magnification and the focal point of a picked up image.

The imaging unit 5009 includes an image sensor and disposed at a succeeding stage to the lens unit 5007. Observation light having passed through the lens unit 5007 is condensed on the light receiving face of the image sensor, and an image signal corresponding to the observation image is generated by photoelectric conversion of the image sensor. The image signal generated by the imaging unit 5009 is provided to the communication unit 5013.

As the image sensor which is included by the imaging unit 5009, an image sensor, for example, of the complementary metal oxide semiconductor (CMOS) type is used which has a Bayer array and is capable of picking up an image in color. It is to be noted that, as the image sensor, an image sensor may be used which is ready, for example, for imaging of an image of a high resolution equal to or not less than 4K. If an image of a surgical region is obtained in a high resolution, then the surgeon 5067 can comprehend a state of the surgical region in enhanced details and can proceed with the surgery more smoothly.

Further, the image sensor which is included by the imaging unit 5009 includes such that it has a pair of image sensors for acquiring image signals for the right eye and the left eye compatible with 3D display. Where 3D display is applied, the surgeon 5067 can comprehend the depth of a living body tissue in the surgical region more accurately. It is to be noted that, if the imaging unit 5009 is configured as that of the multi-plate type, then a plurality of systems of lens units 5007 is provided corresponding to the individual image sensors of the imaging unit 5009.

The imaging unit 5009 may not necessarily be provided on the camera head 5005. For example, the imaging unit 5009 may be provided just behind the objective lens in the inside of the lens barrel 5003.

The driving unit 5011 includes an actuator and moves the zoom lens and the focusing lens of the lens unit 5007 by a predetermined distance along the optical axis under the control of the camera head controlling unit 5015. Consequently, the magnification and the focal point of a picked up image by the imaging unit 5009 can be adjusted suitably.

The communication unit 5013 includes a communication apparatus for transmitting and receiving various kinds of information to and from the CCU 5039. The communication unit 5013 transmits an image signal acquired from the imaging unit 5009 as RAW data to the CCU 5039 through the transmission cable 5065. Thereupon, in order to display a picked up image of a surgical region in low latency, preferably the image signal is transmitted by optical communication. This is because, upon surgery, the surgeon 5067 performs surgery while observing the state of an affected area through a picked up image, it is demanded for a moving image of the surgical region to be displayed on the real time basis as far as possible in order to achieve surgery with a higher degree of safety and certainty. Where optical communication is applied, a photoelectric conversion module for converting an electric signal into an optical signal is provided in the communication unit 5013. After the image signal is converted into an optical signal by the photoelectric conversion module, it is transmitted to the CCU 5039 through the transmission cable 5065.

Further, the communication unit 5013 receives a control signal for controlling driving of the camera head 5005 from the CCU 5039. The control signal includes information relating to image pickup conditions such as, for example, information that a frame rate of a picked up image is designated, information that an exposure value upon image picking up is designated and/or information that a magnification and a focal point of a picked up image are designated. The communication unit 5013 provides the received control signal to the camera head controlling unit 5015. It is to be noted that also the control signal from the CCU 5039 may be transmitted by optical communication. In this case, a photoelectric conversion module for converting an optical signal into an electric signal is provided in the communication unit 5013. After the control signal is converted into an electric signal by the photoelectric conversion module, it is provided to the camera head controlling unit 5015.

It is to be noted that the image pickup conditions such as the frame rate, exposure value, magnification or focal point are set automatically by the control unit 5063 of the CCU 5039 on the basis of an acquired image signal. In other words, an auto exposure (AE) function, an auto focus (AF) function and an auto white balance (AWB) function are incorporated in the endoscope 5001.

The camera head controlling unit 5015 controls driving of the camera head 5005 on the basis of a control signal from the CCU 5039 received through the communication unit 5013. For example, the camera head controlling unit 5015 controls driving of the image sensor of the imaging unit 5009 on the basis of information that a frame rate of a picked up image is designated and/or information that an exposure value upon image picking up is designated. Further, for example, the camera head controlling unit 5015 controls the driving unit 5011 to suitably move the zoom lens and the focus lens of the lens unit 5007 on the basis of information that a magnification and a focal point of a picked up image are designated. The camera head controlling unit 5015 may further include a function for storing information for identifying the lens barrel 5003 and/or the camera head 5005.

It is to be noted that, by disposing the components such as the lens unit 5007 and the imaging unit 5009 in a sealed structure having high airtightness and waterproof, the camera head 5005 can be provided with resistance to an autoclave sterilization process.

Now, a functional configuration of the CCU 5039 is described. The communication unit 5059 includes a communication apparatus for transmitting and receiving various kinds of information to and from the camera head 5005. The communication unit 5059 receives an image signal transmitted thereto from the camera head 5005 through the transmission cable 5065. Thereupon, the image signal may be transmitted preferably by optical communication as described above. In this case, for the compatibility with optical communication, the communication unit 5059 includes a photoelectric conversion module for converting an optical signal into an electric signal. The communication unit 5059 provides the image signal after conversion into an electric signal to the image processing unit 5061.

Further, the communication unit 5059 transmits, to the camera head 5005, a control signal for controlling driving of the camera head 5005. The control signal may also be transmitted by optical communication.

The image processing unit 5061 performs various image processes for an image signal in the form of RAW data transmitted thereto from the camera head 5005. The image processes include various known signal processes such as, for example, a development process, an image quality improving process (a band width enhancement process, a super-resolution process, a noise reduction (NR) process and/or an image stabilization process) and/or an enlargement process (electronic zooming process). Further, the image processing unit 5061 performs a detection process for an image signal in order to perform AE, AF and AWB.

The image processing unit 5061 includes a processor such as a CPU or a GPU, and when the processor operates in accordance with a predetermined program, the image processes and the detection process described above can be performed. It is to be noted that, where the image processing unit 5061 includes a plurality of GPUs, the image processing unit 5061 suitably divides information relating to an image signal such that image processes are performed in parallel by the plurality of GPUs.

The control unit 5063 performs various kinds of control relating to image picking up of a surgical region by the endoscope 5001 and display of the picked up image. For example, the control unit 5063 generates a control signal for controlling driving of the camera head 5005. Thereupon, if image pickup conditions are inputted by the user, then the control unit 5063 generates a control signal on the basis of the input by the user. Alternatively, where the endoscope 5001 has an AE function, an AF function and an AWB function incorporated therein, the control unit 5063 suitably calculates an optimum exposure value, focal distance and white balance in response to a result of a detection process by the image processing unit 5061 and generates a control signal.

Further, the control unit 5063 controls the display apparatus 5041 to display an image of a surgical region on the basis of an image signal for which image processes have been performed by the image processing unit 5061. Thereupon, the control unit 5063 recognizes various objects in the surgical region image using various image recognition technologies. For example, the control unit 5063 can recognize a surgical tool such as forceps, a particular living body region, bleeding, mist when the energy device 5021 is used and so forth by detecting the shape, color and so forth of edges of the objects included in the surgical region image. The control unit 5063 causes, when it controls the display apparatus 5041 to display a surgical region image, various kinds of surgery supporting information to be displayed in an overlapping manner with an image of the surgical region using a result of the recognition. Where surgery supporting information is displayed in an overlapping manner and presented to the surgeon 5067, the surgeon 5067 can proceed with the surgery more safety and certainty.

The transmission cable 5065 which connects the camera head 5005 and the CCU 5039 to each other is an electric signal cable ready for communication of an electric signal, an optical fiber ready for optical communication or a composite cable ready for both of electrical and optical communication.

Here, while, in the example illustrated, communication is performed by wired communication using the transmission cable 5065, the communication between the camera head 5005 and the CCU 5039 may be performed otherwise by wireless communication. Where the communication between the camera head 5005 and the CCU 5039 is performed by wireless communication, there is no necessity to lay the transmission cable 5065 in the operating room. Therefore, such a situation that movement of medical staff in the operating room is disturbed by the transmission cable 5065 can be eliminated.

An example of the endoscopic surgery system 5000 to which the technology according to an embodiment of the present disclosure can be applied has been described above. It is to be noted here that, although the endoscopic surgery system 5000 has been described as an example, the system to which the technology according to an embodiment of the present disclosure can be applied is not limited to the example. For example, the technology according to an embodiment of the present disclosure may be applied to a flexible endoscopic system for inspection or a microscopic surgery system.

The technology according to the present disclosure is applicable as one function of the image processing unit among the configurations described above. Specifically, it is applicable as an execution function of the image down-conversion processing executed in displaying an image captured by a camera on a display device.

In addition, the configuration of the present disclosure enables a down-converted image in which the contrast with no deterioration to be generated and the focus adjustment based on the contrast using the down-converted image to be performed with high accuracy. The technical features of the present disclosure are usable, in one example, in performing manual focus of an endoscopic camera in a surgery using the endoscopic camera.

In one example, a down-converted image is displayed on a monitor, and an indicator representing the contrast state, for example, a peaking display indicating the maximum contrast position is performed. The execution of manual focus based on the peaking display makes it possible to perform highly accurate focus adjustment (focusing).

7. Summary of Configuration of Present Disclosure

The embodiments of the present disclosure have been described in detail with reference to the specific embodiments. However, it is self-evident that those skilled in the art can make modifications and substitutions of the embodiments within a scope not departing from a gist of the present disclosure. In other words, the present invention has been disclosed in the form of exemplification, and should not be interpreted restrictively. In order to determine the gist of the present disclosure, the scope of claims should be taken into consideration.

Moreover, the technology disclosed in the specification herein may include the following configuration.

(1) An image processing apparatus including: an image analysis unit configured to receive an image to be a down-conversion processing target as an input and generate adjacent pixel difference information used to select a pixel to be output to a down-converted image; and an output image generation unit configured to select a pixel pair to be an adjacent pixel used for the down-converted image on the basis of the adjacent pixel difference information generated by the image analysis unit and generate the down-converted image on the basis of the selected pixel pair.

(2) The image processing apparatus according to (1), in which the output image generation unit executes pixel value adjustment of the selected pixel pair to generate the down-converted image.

(3) The image processing apparatus according to (1) or (2), in which the image analysis unit calculates a difference of an adjacent pixel pair of a processing block constituent pixel, executes sort processing of arranging the differences in descending order, and outputs a sorting result to the output image generation unit, and the output image generation unit selects the pixel pair to be used for the down-converted image in descending order of difference values on the basis of the sorting result.

(4) The image processing apparatus according to (3), in which the output image generation unit is prevented from performing the selection if the difference value is larger than a specified threshold.

(5) The image processing apparatus according to (3) or (4), in which the output image generation unit selects the pixel pair until a number of pixels to be used for the down-converted image is reached.

(6) The image processing apparatus according to any one of (3) to (5), in which the image analysis unit calculates a difference of pixel pair of one adjacent pixel of a vertical direction adjacent pixel, a horizontal direction adjacent pixel, or a diagonal direction adjacent pixel of the processing block constituent pixel, and executes sort processing of arranging the calculated difference values in descending order.

(7) The image processing apparatus according to any one of (3) to (6), in which the image analysis unit performs either sort processing of sorting pixel pair differences that allow duplicate use of the processing block constituent pixel or sort processing of sorting pixel pair differences that do not allow duplicate use of the processing block constituent pixel.

(8) The image processing apparatus according to any one of (1) to (7), in which the image analysis unit calculates a luminance average value in a specified peripheral pixel area centered on a processing block and outputs the calculated luminance average value to the output image generation unit, and the output image generation unit executes pixel value adjustment of the pixel pair to be the adjacent pixel used for the down-converted image on the basis of the luminance average value.

(9) The image processing apparatus according to (8), in which the output image generation unit calculates an output signal adjustment gain on the basis of the luminance average value, multiplies the calculated output signal adjustment gain by a difference value of a pixel value difference of the pixel pair used for the down-converted image to generate a gain multiplication difference value, and adjusts a pixel value of each pixel constituting the pixel pair by using the generated gain multiplication difference value.

(10) The image processing apparatus according to (9), in which the output image generation unit calculates an output pixel value of the down-converted image by adding the gain multiplication difference value to a pixel having a larger pixel value constituting the pixel pair and subtracting the gain multiplication difference value from a pixel having a smaller pixel value constituting the pixel pair.

(11) The image processing apparatus according to (9) or (10), in which the output image generation unit applies a predetermined conversion function to calculate the output signal adjustment gain on the basis of the luminance average value.

(12) The image processing apparatus according to any one of (1) to (11), in which the output image generation unit has a pixel arrangement determination unit configured to determine arrangement in the down-converted image of the pixel pair used for the down-converted image, and the pixel arrangement determination unit determines the arrangement in the down-converted image on the basis of a positional relationship of the pixel pair in the image to be the down-conversion processing target.

(13) The image processing apparatus according to (12), in which the pixel arrangement determination unit determines the arrangement in the down-converted image in such a way that a vertical arrangement relationship and a horizontal arrangement relationship of the pixel pair in the image to be the down-conversion processing target are not reversed.

(14) The image processing apparatus according to any one of (1) to (13), in which the image analysis unit calculates a luminance value of each pixel based on a pixel value of the image to be the down-conversion processing target, and the adjacent pixel difference information includes pixel luminance value difference information.

(15) An image processing method executed in an image processing apparatus, the method including:

an image analysis step of, by an image analysis unit, receiving an image to be a down-conversion processing target as an input and generating adjacent pixel difference information used to select a pixel to be output to a down-converted image; and an output image generation step of, by an output image generation unit, selecting a pixel pair to be an adjacent pixel used for the down-converted image on the basis of the adjacent pixel difference information generated in the image analysis step and generating the down-converted image on the basis of the selected pixel pair.

(16) A program causing an image processing apparatus to execute image processing including:

an image analysis step of causing an image analysis unit to receive an image to be a down-conversion processing target as an input and to generate adjacent pixel difference information used to select a pixel to be output to a down-converted image; and an output image generation step of causing an output image generation unit to select a pixel pair to be an adjacent pixel used for the down-converted image on the basis of the adjacent pixel difference information generated in the image analysis step and to generate the down-converted image on the basis of the selected pixel pair.

Further, the series of processing described in the specification can be executed by hardware, software, or a complex configuration of the both. In a case where the processing is executed using software, it is possible to execute the processing by installing a program recording a processing sequence on a memory in a computer built into dedicated hardware or by installing a program in a general-purpose computer that can execute various processes. For example, the program can be recorded in a recording medium in advance. In addition to installing on a computer from the recording medium, it is possible to receive a program via a network, such as a local area network (LAN) and the Internet, and install the received program on a recording medium such as a built-in hard disk.

Note that various processes described in the specification not only are executed in a time-series manner according to the description but also may be executed in parallel or separately depending on the processing performance of an apparatus that executes the process or need. Furthermore, the term "system" in the present specification refers to a logical set configuration of a plurality of apparatuses, and is not limited to a system in which apparatuses of the respective configurations are provided in the same housing.

INDUSTRIAL APPLICABILITY

As described above, the configuration of one embodiment of the present disclosure allows achieving an apparatus and a method of generating a down-converted image that does not significantly compromise the contrast or texture information of an original image.

Specifically, for example, it includes an image analysis unit configured to receive an image to be a down-conversion processing target as an input and generate adjacent pixel difference information used to select a pixel to be output to a down-converted image, and an output image generation unit configured to select a pixel pair to be an adjacent pixel used for the down-converted image on the basis of the adjacent pixel difference information and generate the down-converted image by executing an adjustment of the selected pixel pair. The image analysis unit calculates a difference of an adjacent pixel pair of a processing block constituent pixel, generates a sorting result of arranging the differences in descending order, and the output image generation unit selects the pixel pair to be used for the down-converted image in descending order of difference values on the basis of the sorting result.

These processes allow achieving an apparatus and a method of generating a down-converted image that does not significantly compromise the contrast or texture information of an original image.

REFERENCE SIGNS LIST

100 Image processing apparatus
120 Image analysis unit
121 Memory
122 Luminance signal generation unit
123 Adjacent pixel difference calculation unit
124 Peripheral luminance average value calculation unit
125 Sort processing unit
150 Output pixel selection unit
160 Pixel value adjustment unit
161 Low-amplitude difference removal unit
162 Peripheral luminance dependence coefficient calculation unit
163 Difference gain adjustment unit
164 Output signal adjustment unit
170 Pixel arrangement determination unit
300 Imaging apparatus
301 Optical lens
302 Image sensor
303 A/D converter
304 Signal processing unit
305 Memory
306 Display unit
307 Recorder
308 Input unit
310 Control unit
320 Down-conversion processing unit
501 CPU
502 ROM
503 RAM
504 Bus
505 Input/output interface
506 Input unit
507 Output unit
508 Storage unit
509 Communication unit
510 Drive
511 Removable media
521 Imaging unit
522 Display unit

The invention claimed is:

1. An image processing apparatus, comprising:
a central processing unit (CPU) configured to:
receive an image to be a down-conversion processing target as an input;
calculate differences of adjacent pixel pairs of a processing block constituent pixel, wherein each of the differences of the adjacent pixel pairs is a difference value of one of a luminance signal or a RGB signal of pixels in the corresponding adjacent pixel pairs;
execute a sort processing operation for arranging difference values of the adjacent pixel pairs in a descending order;
output a sorting result based on the executed sort processing operation;
generate an adjacent pixel difference information corresponding to the sorting result;
select a pixel pair to be adjacent pixels for a down-converted image based on the generated adjacent pixel difference information, wherein the pixel pair is excluded when the corresponding difference value is larger than a specific threshold; and
generate the down-converted image based on the selected pixel pair.

2. The image processing apparatus according to claim 1, wherein the CPU is further configured to execute a pixel value adjustment of the selected pixel pair.

3. The image processing apparatus according to claim 1, wherein the CPU is further configured to select the pixel pair until a number of pixels for the down-converted image is reached.

4. The image processing apparatus according to claim 1, wherein the CPU is further configured to calculate the difference of the adjacent pixel pair, wherein the adjacent pixel pair is one of a vertical direction adjacent pixel, a horizontal direction adjacent pixel, or a diagonal direction adjacent pixel of the processing block constituent pixel.

5. The image processing apparatus according to claim 1, wherein the CPU is further configured to execute one of the sort processing operation of sorting pixel pair differences that allow duplicate use of the processing block constituent pixel, or the sort processing of sorting pixel pair differences that do not allow duplicate use of the processing block constituent pixel.

6. The image processing apparatus according to claim 2, wherein the CPU is further configured to:
calculate a luminance average value in a specified peripheral pixel area centered on a processing block;
output the calculated luminance average value; and
execute the pixel value adjustment of the selected pixel pair based on the luminance average value.

7. The image processing apparatus according to claim 6, wherein the CPU is further configured to:
calculate an output signal adjustment gain based on the luminance average value;
multiply the calculated output signal adjustment gain by the difference value of the pixel pair used for the down-converted image to generate a gain multiplication difference value; and
adjust a pixel value of each pixel constituting the pixel pair based on the generated gain multiplication difference value.

8. The image processing apparatus according to claim 7, wherein the CPU is further configured to calculate an output pixel value of the down-converted image by adding the gain multiplication difference value to a pixel having a larger pixel value constituting the pixel pair and subtracting the gain multiplication difference value from a pixel having a smaller pixel value constituting the pixel pair.

9. The image processing apparatus according to claim 7, wherein the CPU is further configured to apply a conversion function to calculate the output signal adjustment gain based on a basis of the luminance average value.

10. The image processing apparatus according to claim 1, wherein the CPU is further configured to determine an arrangement, in the down-converted image, of the pixel pair for the down-converted image based on a basis of a positional relationship of the pixel pair in the image.

11. The image processing apparatus according to claim 10, wherein the CPU is further configured to determine the arrangement in the down-converted image in such a way that a vertical arrangement relationship and a horizontal arrangement relationship of the pixel pair in the image are not reversed.

12. The image processing apparatus according to claim 1, wherein
- the CPU is further configured to calculate a luminance value of each pixel based on a pixel value of the image, and
- the adjacent pixel difference information includes a pixel luminance value difference information.

13. An image processing method executed in an image processing apparatus, the image processing method comprising:
- receiving an image to be a down-conversion processing target as an input;
- calculating differences of adjacent pixel pairs of a processing block constituent pixel, wherein each of the differences of the adjacent pixel pairs is a difference value of one of a luminance signal or a RGB signal of pixels in the corresponding adjacent pixel pairs;
- executing a sort processing operation for arranging difference values of the adjacent pixel pairs in a descending order;
- outputting a sorting result based on the executed sort processing operation;
- generating an adjacent pixel difference information corresponding to the sorting result;
- selecting a pixel pair to be adjacent pixels for a down-converted image based on the generated adjacent pixel difference information, wherein the pixel pair is excluded when the corresponding difference value is larger than a specific threshold; and
- generating the down-converted image based on a basis of the selected pixel pair.

14. A non-transitory computer-readable medium having stored thereon, computer-executable instructions, which when executed by a computer, cause the computer to execute image processing operations, the image processing operations comprising:
- receiving an image to be a down-conversion processing target as an input;
- calculating differences of adjacent pixel pairs of a processing block constituent pixel, wherein each of the differences of the adjacent pixel pairs is a difference value of one of a luminance signal or a RGB signal of pixels in the corresponding adjacent pixel pairs;
- executing a sort processing operation for arranging difference values of the adjacent pixel pairs in a descending order;
- outputting a sorting result based on the executed sort processing operation;
- generating an adjacent pixel difference information corresponding to the sorting result;
- selecting a pixel pair to be adjacent pixels for a down-converted image based on the generated adjacent pixel difference information, wherein the pixel pair is excluded when the corresponding difference value is larger than a specific threshold;
- generating the down-converted image based on the selected pixel pair.

* * * * *